(12) United States Patent
Rowell et al.

(10) Patent No.: US 10,848,743 B2
(45) Date of Patent: Nov. 24, 2020

(54) 3D CAMERA CALIBRATION FOR ADJUSTABLE CAMERA SETTINGS

(71) Applicant: Lucid VR, Inc., Santa Clara, CA (US)

(72) Inventors: Adam Rowell, Mountain View, CA (US); Sheldon Fernandes, San Jose, CA (US); Han Jin, Milpitas, CA (US)

(*) Notice: Subject to any disclaimer, the term of this patent is extended or adjusted under 35 U.S.C. 154(b) by 0 days.

(21) Appl. No.: 16/166,018

(22) Filed: Oct. 19, 2018

(65) Prior Publication Data

US 2019/0058870 A1 Feb. 21, 2019

Related U.S. Application Data

(60) Continuation-in-part of application No. 15/920,160, filed on Mar. 13, 2018, which is a division of application No. 15/179,056, filed on Jun. 10, 2016, now Pat. No. 9,948,919.

(51) Int. Cl.
| | |
|---|---|
| *H04N 13/00* | (2018.01) |
| *G06T 7/80* | (2017.01) |
| *H04N 5/232* | (2006.01) |
| *H04N 13/246* | (2018.01) |
| *H04N 9/82* | (2006.01) |

(Continued)

(52) U.S. Cl.
CPC ............ *H04N 13/246* (2018.05); *G06T 7/85* (2017.01); *H04N 5/23238* (2013.01); *H04N 5/23267* (2013.01); *H04N 5/772* (2013.01); *H04N 9/8205* (2013.01); *H04N 9/8227* (2013.01); *H04N 9/8715* (2013.01); *H04N 13/117* (2018.05); *H04N 13/178* (2018.05); *H04N 13/189* (2018.05); *H04N 13/239* (2018.05); *H04N 13/243* (2018.05); *H04N 13/282* (2018.05); *H04N 13/296* (2018.05); *H04N 13/344* (2018.05); *H04N 17/002* (2013.01); *H04N 5/907* (2013.01)

(58) Field of Classification Search
CPC ..... H04N 13/246; H04N 5/23267; G06T 7/85
See application file for complete search history.

(56) References Cited

U.S. PATENT DOCUMENTS 5,850,352 A * 12/1998 Moezzi ................ H04N 13/139
345/419
6,985,175 B2 * 1/2006 Iwai ........................ G01C 3/08
348/187

(Continued)

OTHER PUBLICATIONS

An effective calibration procedure for correction of parallax unmatched image pairs; (Year: 2009).*

(Continued)

*Primary Examiner* — Luis Perez-Fuentes

(57) ABSTRACT

Described are calibration and rectification systems and methods for 3D cameras. The calibration methods described herein derive calibration parameters in real time for multiple camera settings. Calibration parameters are used to rectify stereo images as part of a process for creating 3D images, videos, and VR or AR experiences. Additionally multi-camera systems for implementing the calibration and rectification methods are disclosed. 3D camera calibration methods involving a limited number of calibration points reduce the cost and complexity of conventional calibration methods while also allowing for higher performing 3D cameras having many possible configurations of camera settings.

3 Claims, 18 Drawing Sheets

(51) Int. Cl.
*H04N 5/77* (2006.01)
*H04N 9/87* (2006.01)
*H04N 13/239* (2018.01)
*H04N 13/296* (2018.01)
*H04N 13/178* (2018.01)
*H04N 13/189* (2018.01)
*H04N 13/117* (2018.01)
*H04N 17/00* (2006.01)
*H04N 13/243* (2018.01)
*H04N 13/344* (2018.01)
*H04N 13/282* (2018.01)
*H04N 5/907* (2006.01)

(56) References Cited

U.S. PATENT DOCUMENTS 9,338,447 B1 * 5/2016 Crump .................. G06T 7/80
9,462,263 B2 * 10/2016 BenMoshe ............ G06T 7/85
9,948,919 B2 * 4/2018 Jin .................... H04N 5/23267

OTHER PUBLICATIONS

Color calibration for multi-camera image system; Sabri; 2010. (Year: 2010).*
Camera Auto-calibration for Image Enhancement on Smartphones; 2015. (Year: 2015).*
IP.com Prior Art Database search; 2020. (Year: 2020).*
NPL Google Search; 2020. (Year: 2020).*

* cited by examiner

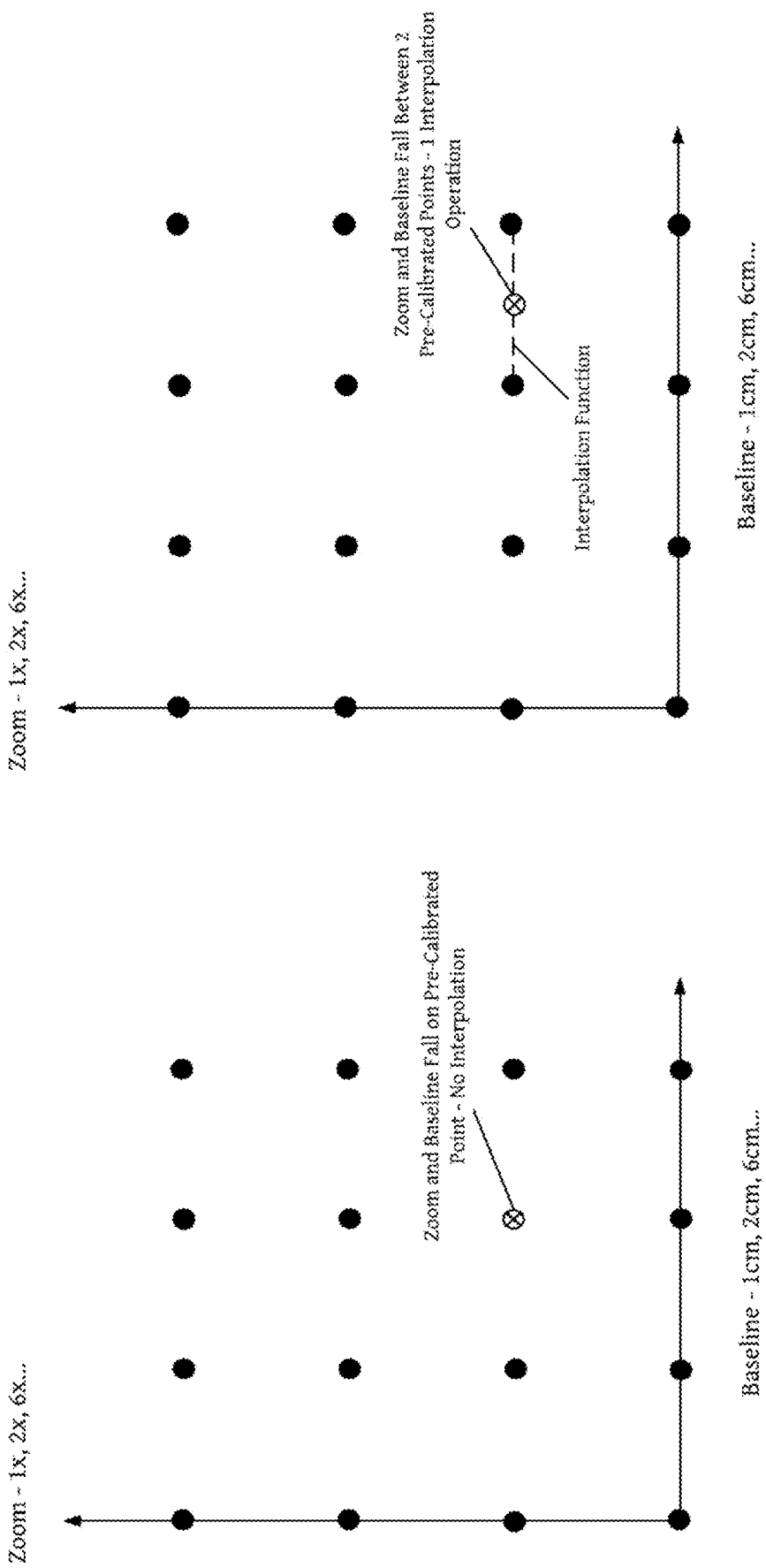

3D CAMERA CALIBRATION FOR ADJUSTABLE CAMERA SETTINGS

CROSS REFERENCE TO RELATED APPLICATIONS

This application is a continuation in part of U.S. patent application Ser. No. 15/920,160 entitled "STEREOSCOPIC 3D CAMERA FOR VIRTUAL REALITY EXPERIENCE," filed Mar. 13, 2018, which is a divisional application of U.S. patent application Ser. No. 15/179,056 entitled "STEREOSCOPIC 3D CAMERA FOR VIRTUAL REALITY EXPERIENCE," filed Jun. 10, 2016; all of which are incorporated by reference herein in their entirety.

BACKGROUND

Virtual reality (VR) is a computer technology that simulates an environment. Virtual reality can replicates different sensory experience, e.g., sight, touch, hearing or smell in a way that allows a user to interact with the simulated environment. In particular, some virtual reality technologies focus on visual experience. The visual experience is displayed on a computer screen or with a virtual reality headset (also referred to as head mounted display or HMD). The virtual reality technology simulates the immersive environment in a way close to the real world experience in order to replicate a lifelike experience.

VR is one example application that relies on successful camera calibration. Other non-limiting example applications within the field of computer vision that depend on geometric camera calibration include, image registration, object positioning, volumetric 3D construction, dimensional measurements, disparity mapping, gaming, augmented-reality environments, and photogrammetry. The calibration techniques described herein are useful in multiple camera systems including stereoscopic cameras. Stereoscopic camera calibration involves computing intrinsic parameters for each camera independently and then computing the relative extrinsic parameters between the two intrinsically calibrated cameras. Rectification and projection matrices are derived from the extrinsic and extrinsic parameters and used to rectify and wrap the right and left images.

DETAILED DESCRIPTION

Other than the different perspectives, human eyes are very sensitive to any differences between the left and right eye visions. When there is a noticeable difference in distortions, pixel alignment, or warping between the left and right channels of the 3D video, the stereoscopic 3D effect experienced by the user is significantly suppressed. During the manufacturing processes of lenses, digital image sensors, and the stereoscopic devices, various types of manufacturing variances can be introduced.

Figure 1:
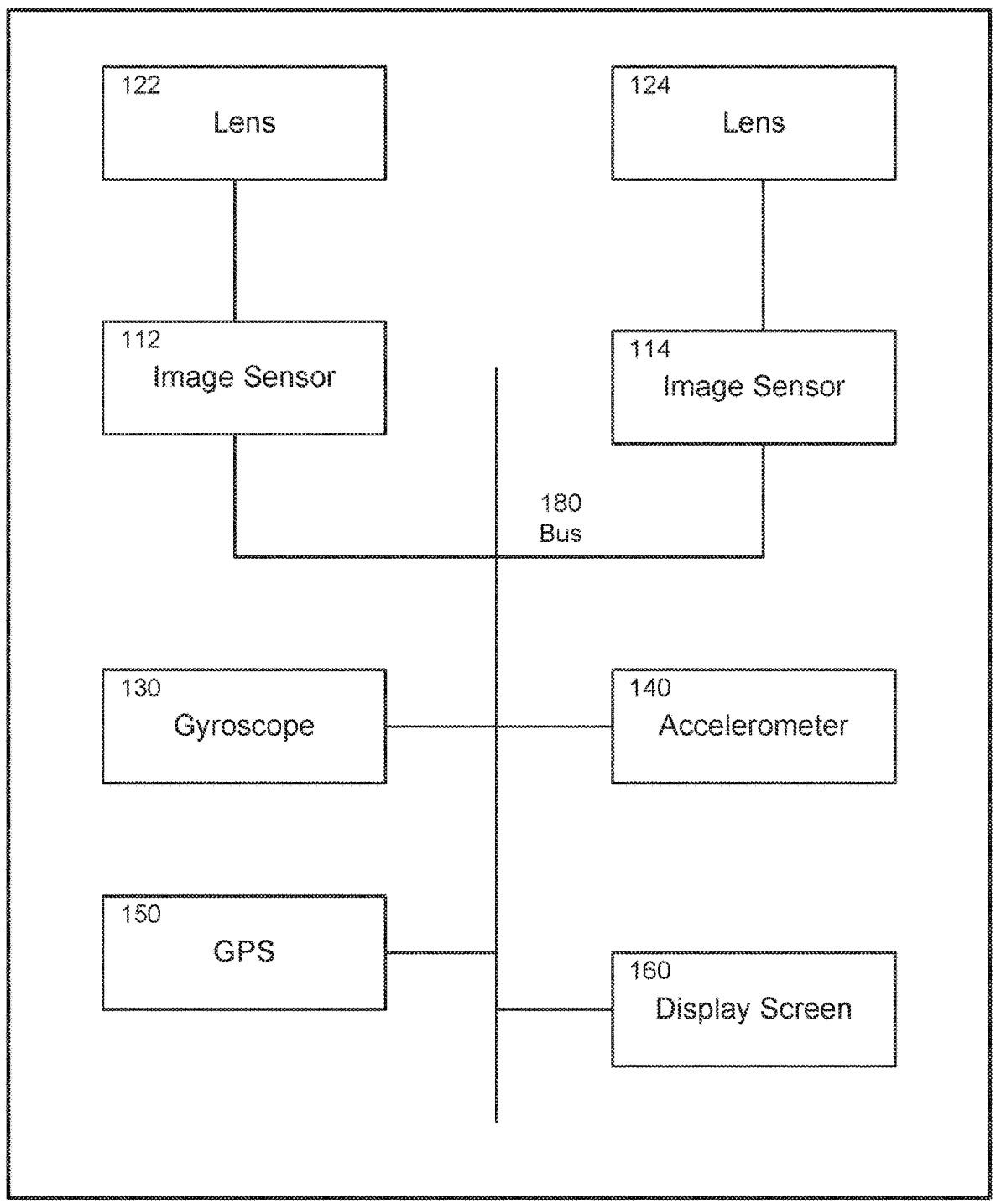
FIG. 1 is a block diagram showing components of a stereoscopic 3D video camera that can record stereoscopic videos and embed stereoscopic calibration metadata.

FIG. 1 is a block diagram showing components of a stereoscopic 3D video camera device that can record three-dimensional (3D) stereoscopic videos and embed 3D stereoscopic calibration metadata. The stereoscopic 3D video camera device (also referred to as stereoscopic device) captures 3D images and/or videos with a normal or wide field of view (FOV). In one possible example, the disclosed 3D VR technology provides a virtual reality (VR) experience by immersing a user in a simulated environment using the captured 3D images or videos. The playback device for simulating the immersive 3D VR environment can be either the stereoscopic 3D video camera itself, or a separate display device or HMD.

Additionally, the disclosed 3D VR technology provides a VR experience by projecting 3D images on a device fitted with a 3D or holographic display screen. One possible example of a display screen compatible with the disclosed 3D VR technology includes a light field display such as a nano-textured diffractive light field backlighting holographic display or other two or four view display having multiple LCD layers with a directional backlight. These systems produce a 3D effect by giving the user two different views of the same object they can perceive with each eye.

In some embodiments, the stereoscopic device includes two wide-angle lenses (e.g., fish-eye lenses) to capture 3d images and videos with a wide field of view. For example, the field of view can be, e.g., 180 degrees. The two wide-angle lenses can be spaced apart at a distance similar to a typical distance between the human eyes. Alternatively, the distance between the lenses can be varied to provide an adjustable camera baseline.

The stereoscopic device can further include two digital image sensors that capture images based on light transmitted through the two wide-angle lenses. Each image sensor is mounted behind one of the normal or wide-angle lenses. The digital image sensors can be, e.g., charge-coupled devices (CCDs) or complementary metal-oxide-semiconductor (CMOS) devices that convert the light signals into digital data. The lenses and the digital image sensors can simultaneously capture images or video streams from two different perspectives, each with a normal or wide field of view (e.g., 180 degrees for wide field of view).

As shown in FIG. 1, the stereoscopic 3D video camera device 100 includes two or more image sensors 112 and 114 fitted with one lens (122 and 124) per sensor. The lens 122 and image sensor 112 can capture images or videos for a left eye channel; while the lens 124 and image sensor 114 can capture images or videos for a right eye channel. During a playback stage, the images or videos for the left eye channel will be played back to be perceived by a left eye of a user; while the images or videos for the right eye channel will be played back to be perceived by a right eye of a user. Because of the left and right channels are captured from two different perspectives, the user is able to experience the 3D effect using his eyes.

Each of the image sensors 112, 114 and lenses 122, 124 have associated parameters, such as the sensor size, resolution, and interocular distance, the lens focal lengths, lens distortion centers, lens skew coefficient, and lens distortion coefficients. The parameters of each image sensor and lens may be unique for each image sensor or lens, and are often determined through a stereoscopic camera calibration process.

During the video capturing process, the image sensors (e.g., 112, 114) record video frames, and the stereoscopic camera combines the frames from the individual image sensors into a composite video file. In some embodiments, the composite video file includes two channels of video streams, for left and right eyes respectively. The video frames may be processed prior to being encoded into the video file, with additional image processing parameters describing the processing.

Additionally, the device 100 may have additional sensors, such as a gyroscope 130, accelerometer 140, or GPS device 150 to record information related to the movement or position of the stereoscopic device 100. A bus 190, for example, a high-bandwidth bus, such as an Advanced High-performance Bus (AHB) matrix interconnects the electrical components of the device 100.

The stereoscopic device 100 can further include a storage device for storing the digital data of the captured images and videos (also referred to image data and video data). For example, the storage device can be, e.g., a flash memory, a solid-state drive (SSD) or a magnetic storage device.

The stereoscopic device 100 can include one or more data interfaces for communicating with external devices. For example, the stereoscopic device can include a USB interface that is capable of connecting to an external device (e.g., a laptop, an external hard drive, a tablet, a smart phone) for transmitting the video data or video data to the external device.

In some embodiments, the stereoscopic device 100 itself can further function as a playback device, for example, a media player or a virtual reality headset. The device includes a display screen (e.g., display screen 160) for playing back the captured 3D images or 3D videos. The device can utilize a motion sensor (e.g., accelerometer 140, or an inertial measurement unit, as referred to as IMU) for determining head position and orientation of a user who wears the stereoscopic device as a virtual reality headset. The shape of the stereoscopic device is designed to fit into a mounting device to form a head mount device. The mounting device is for attaching the stereoscopic device on the head of the user such that the user's eyes are in front of the left and right portions of the display screen respectively.

The device simultaneously records two videos from two different perspectives using the two digital image sensors. In one possible example, wide-angle lenses 112 and 124 are used to capture videos with wide field of views (FOVs), e.g., 180 degrees. Such a field of view is wider than the field of view of human eyes. For example, the average human has a binocular vision with a field of view of 114 degrees (horizontally). During playing back, when used as a virtual reality headset, the stereoscopic device determines the head position and orientation and only plays back a cropped portion of the captured 3D images or videos. The sizes and locations of the cropping windows depend on the detected head position and orientation, as well as the user's field of view.

The device plays back the cropped 3D images or videos with a narrower field of view on the left and right portions of the display screen. The left eye of the user is in front of the left portion of the display screen, and views the left channel of the cropped 3D images or videos. Similarly, the right eye of the user is in front of the right portion of the display, and views the right channel of the cropped 3D images or videos. Because the left and right channels of the 3D images or videos were captured at two different perspectives, the user experiences a stereoscopic 3D effect.

When the user moves the head to a different position or orientation, the motion sensor detects the movement. Based on the new head position or orientation, the device determines new positions (or new sizes as well) of the cropping windows and generates in real time the cropped 3D images or videos. Therefore, the field of view experienced by the user eyes changes correspondingly as the user moves the head. Thus, the user is immersed in a virtual reality created based on the 3D images or videos.

In this way, the user can move the head to look freely in different directions at different parts of the 3D image or 3D video within the wide field of view (e.g. 180 degrees, or even 360 degrees). Because the field of view of the captured 3D image or 3D video (prior to cropping) is larger than the field of view of the human vision, the user experiences a sense of presence in a virtual environment created based on the captured 3D image or 3D video. In other words, the 3D image or video provides the user a realistic illusion of being immersed into the image or video.

In some embodiments, the stereoscopic device does not need to combine the left and right channels of the 3D image or 3D video into a single channel, since the two channels are shown separately to the left and right eyes of the user. In some other embodiments, the left and right channels of the 3D image or 3D video can be combined together to form a single feed of image or video such that there is no visible seam between the left and right portions of the display screen when the device plays back the 3D image or 3D video.

In some embodiments, multiple stereoscopic devices can be used together to capture the 3D image or 3D video in a super wide field of view (e.g., 360 degrees). For example, three stereoscopic devices or six camera modules can be mounted on a 360 rig mount such the stereoscopic devices or camera modules are facing different directions. The 3D images or 3D videos captured by the stereoscopic devices or camera modules can be stitched together to create a 360-degree virtual reality experience. For example, when a user moves the head at any orientation with the 360 degrees, the device in real time plays back a cropped portion of the 360-degree stitched 3D videos based on the head orientation and human vision field of view. Therefore, the user can experience a sense of presence in a 360-degree virtual environment based on the 360-degree 3D image or 3D video captured simultaneously by the three stereoscopic devices. Additionally, the greater the number of different angles of perspective the cameras are able to capture for a scene the better the 3D depth generated at each playback angle. For example, systems having six or eight cameras spaced 60 or 45 radial degrees apart will provide better 3D depth at more playback angles of view than camera systems having three cameras spaced 120 radial degrees apart.

Figure 2:
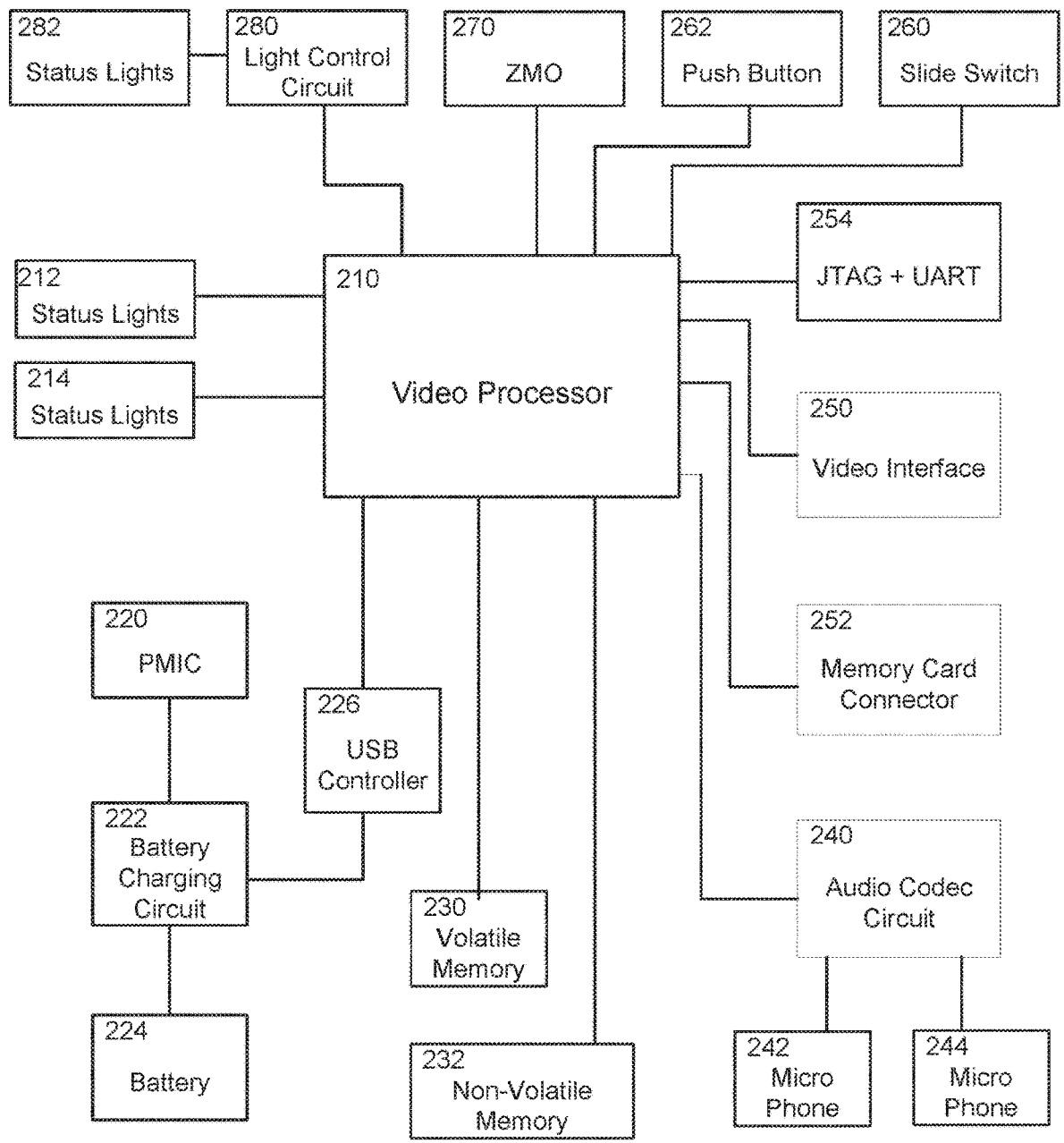
FIG. 2 is a block diagram showing various components of a sample stereoscopic device.

In addition to the lens and image sensors, the stereoscopic device can include various types of components. FIG. 2 is a block diagram showing various components of a sample stereoscopic device. The stereoscopic device 200 includes a video processor 210 for processing various data collected by different components. The video processor 210 receives captured image data from image sensors 212 and 214.

A power management integrated circuit (PMIC) 220 is responsible for controlling a battery charging circuit 222 to charge a battery 224. The battery 224 supplies electrical energy for running the stereoscopic device 200. The video processor 210 can be connected to an external device via a USB controller 226. In some embodiments, the battery charging circuit 222 receives external electrical energy via the USB controller 226 for charging the battery 224.

The stereoscopic device 200 includes a volatile memory 230 (e.g. double data rate memory or 4R memory) and a non-volatile memory 232 (e.g., embedded MMC or eMMC, solid-state drive or SSD, etc.). The video processor 210 can also control an audio codec circuit 240, which collects audio signals from microphone 242 and microphone 244 for stereo sound recording.

The stereoscopic device 200 can include additional components to communicate with external devices. For example, the video processor 210 can be connected to a video interface 250 (e.g., high-definition multimedia interface or HDMI) for sending video signals to an external device. The device 200 can further include an interface 254 conforming to Joint Test Action Group (JTAG) standard and Universal Asynchronous Receiver/Transmitter (UART) standard.

The stereoscopic device 200 can include a memory card connector 252 to accommodate a memory card for providing additional storage space. The device 200 can further include a slide switch 260 and a push button 262 for operating the device 200. For example, a user may turn on or off the device 200 by pressing the push button 262. The user may switch between different modes (e.g., image capturing, video capturing, 3D capturing) using the slide switch 260.

The device 200 can include an inertial measurement unit (IMU) 270 for detecting orientation and/or motion of the device 200. The video processor 210 can further control a light control circuit 280 for controlling the status lights 282. The status lights 282 can include, e.g., multiple light-emitting diodes (LEDs) in different colors for showing various status of the device 200.

Stereoscopic 3D Calibration for VR

Other than the different perspectives, human eyes are very sensitive to any differences between the left and right eye visions. When there is a noticeable difference in distortions, pixel alignment, or warping between the left and right channels of the 3D video, the stereoscopic 3D effect experienced by the user is significantly suppressed. During the manufacturing processes of lenses, digital image sensors, and the stereoscopic devices, various types of manufacturing variances can be introduced.

As shown in FIG. 1, the stereoscopic 3D camera device records stereoscopic image frames from two different camera modules, each of which includes a lens and an image sensor. In one example, the lens is a wide angle lens, for example, a fish eye lens. The stereoscopic camera device can store calibration metadata related to the lenses and images sensors of the camera device for correcting distortion, alignment, warping, or any other factors effecting 3D video quality caused by manufacturing variances of the lenses, digital image sensors, and stereoscopic camera devices.

Figure 3:
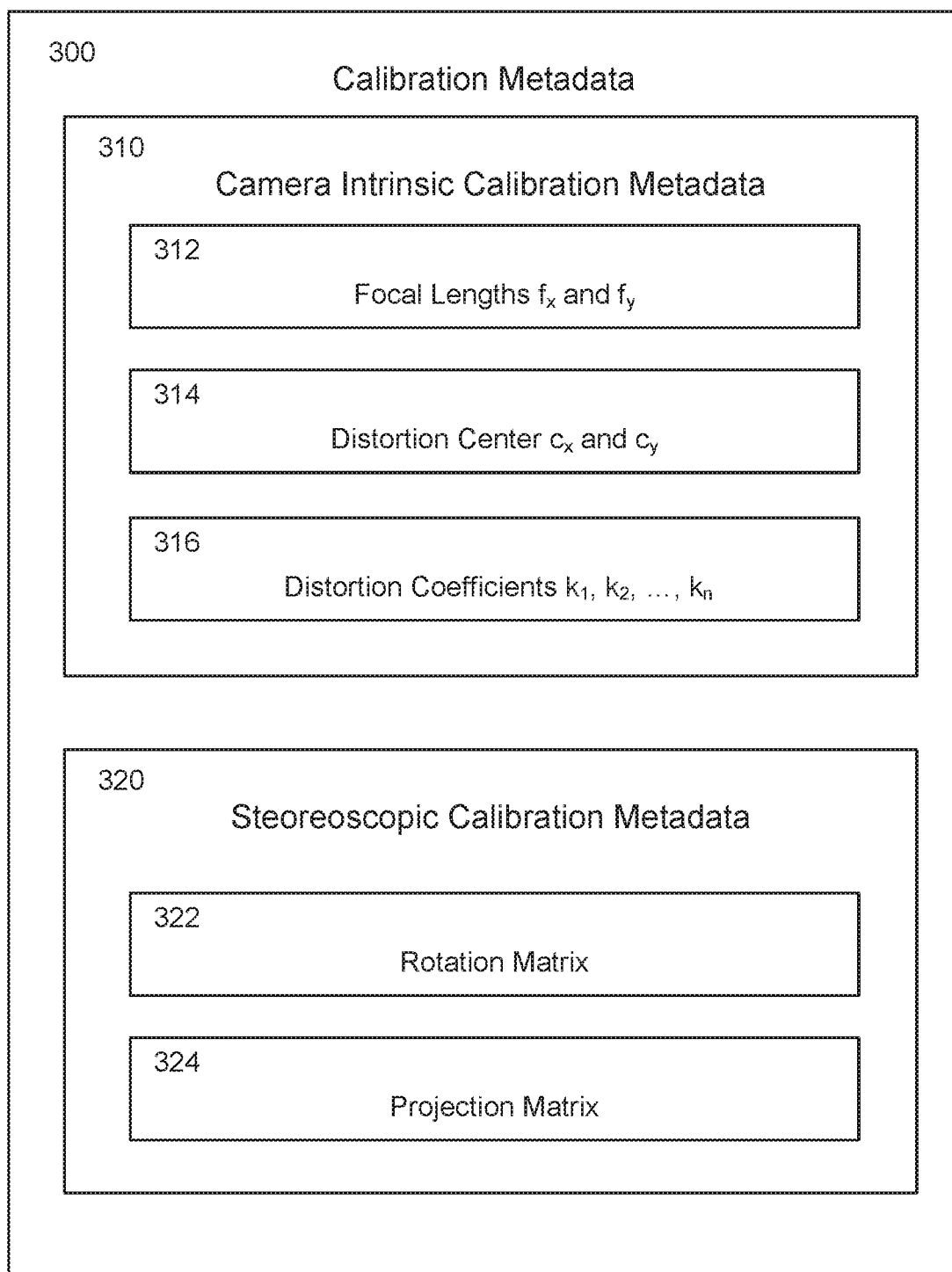
FIG. 3 shows a sample set of calibration metadata including various types of information for a sample stereoscopic device.

FIG. 3 shows a sample set of calibration metadata including various types of information for a sample stereoscopic device. At manufacture time, two types of calibration metadata 300 (also referred to as calibration information) are determined for each stereoscopic 3D camera device, in order to properly render the final 3D images or videos perceived by the users. At manufacture time, each camera module is calibrated to determine its camera intrinsic calibration metadata 310. Furthermore, stereoscopic calibration metadata 320 (also referred to as extrinsic calibration metadata), which relates to the relevant relationship between the two camera modules, is also determined.

In some embodiments, the camera intrinsic calibration metadata 310 for a camera module (which includes a lens and an image sensor) can include intrinsic calibration parameters $f_x$, $f_y$, $c_x$, $c_y$, and $k_1$, $k_2$, ..., $k_n$. Due to routine manufacturing variations, each of the camera modules has a unique set of camera intrinsic calibration metadata.

The $f_x$ and $f_y$ parameters 312 describe the focal lengths of the lens in the x and y directions that are perpendicular to each other. The focal lengths are the distances over which initially collimated light rays are brought to a focus, and measures of how strongly the lens converges or diverges lights. A lens with a shorter focal length can bend the light rays more sharply. Lenses that are not perfectly circular, for example, some fisheye lenses, may distort or bend the light in slightly different ways in the x direction versus the y direction. Thus, the focal length at the x direction $f_x$ can be different from the focal length at the y direction $f_y$ for asymmetrically curved lenses.

The $c_x$ and $c_y$ parameters 314 describe the distortion center of the projection in the image frame captured by the lens. Since lenses including some fisheye lenses may not have prefect circular symmetry, the distortion center denoted by $c_x$ and $c_y$ may not be positioned at the geometric center of the image frame.

The $k_1$, $k_2$, ..., $k_n$ parameters 316 are distortion coefficients that describe the levels of lens distortion, as a function of the radius from the center of the captured image frame to the edge of the frame. In some embodiments, n can be, for example, between 1 and 16, depending on how precise the calibration needs to be and the characteristics of the particular lens. The $k_1$, $k_2$, ..., $k_n$ parameters essentially describe how much distortion an image pixel has as a location of the pixel moves from the center of the image to the edge of the image. In some embodiments, the $k_1$, $k_2$, ..., $k_n$ parameters are defined radially and do not depend on the circular angle of the pixel location. The distortion coefficients are variable depending on the type of lenses used in the camera module. For example, different polynomial lens distortion models having different numbers of distortion coefficients with different values and orders of magnitude are used to describe distortion levels for fisheye and non-fisheye lenses.

There are various reasons why each camera module has its own set of camera intrinsic calibration metadata. In some embodiments, the distance between the left lens and the left image sensor may be slightly shorter than the distance between the right lens and the right image sensor. Alternatively, due to the manufacturing variance of the lenses, the left lens may have an optical distortion profile and/or focal length that are different from the optical distortion profile and/or focal length of the right lens.

In addition to the camera intrinsic calibration metadata, the camera device is also calibrated to determine stereoscopic calibration metadata 320 for the two camera modules. The stereoscopic calibration metadata 320 describes the relative position of between the two cameras. The stereoscopic calibration metadata 320 includes a mapping of coordinates between the right and left image channels. From this set of coordinate points, projection and rectification matrices and the relationship of distortion in one lens relative to another lens can be determined. The distortion relationship is used to correct lens distortion and the projection and rectification matrices are used to rectify and warp the images generated by each camera module to further improve image quality.

Ideally, the two lenses of the stereoscopic camera are perfectly aligned next to each other. However, in an actual camera product, any of the lenses may be slightly off-center from the perfectly aligned location or its direction may be slightly off the perfectly aligned orientation. The stereoscopic calibration metadata can be used to correct the captured images offset the distortion caused by imperfect alignment between those two lenses. After applying the distortion model, it appears as if two lenses with perfect alignment took the images. This correction improves the 3D effect since human eyes are very sensitive to the distortion differences between left and right channels.

In some embodiments, the set of stereoscopic calibration metadata 320 includes a rotation matrix 322 and a translation matrix 324. The rotation matrix 322 describes a rotational correction to align an image captured by one fisheye lens to another image captured by another fisheye lens so that the image planes of the left and right channels are on the same plane. The translation matrix 324 describes a translation operation that ensures the image frames from the left and right channels are vertically aligned.

In some embodiments, the set of stereoscopic calibration metadata 320 can include other compensation metadata that relates to image sensors. For example, the image sensor of the left channel may have slightly different color balance than the image sensor of the right channel. Based on a color calibration test, the camera can store color-mapping metadata as portion of the stereoscopic calibration metadata to equalize the color balance between the right and left image sensors to provide a uniform color profile.

In order to enhance the stereoscopic 3D effect, it is desirable to eliminate the optical distortion difference between the left and right channels of the 3D video due to the manufacturing variances. After the stereoscopic device is manufactured, the device, including the wide-angle lens and the image sensors, can be tested through a calibration process to detect the distortion differences between the left and right channels, represented by the sets of camera intrinsic calibration metadata and the stereoscopic calibration metadata. During the calibration process at manufacture, the stereoscopic device can capture 3D stereoscopic images and/or videos of several pre-determined reference objects (also referred to as calibration targets) at different angles, and generate calibration metadata based on the images or videos of the reference objects.

When the stereoscopic device captures images and videos, the calibration metadata may be stored within the 3D stereoscopic images or videos in real time. Using those calibration metadata, the captured 3D stereoscopic images or videos can be played back with a compensation based on the calibration metadata. The calibration metadata are also referred to as a calibration vector. Each element of the calibration vector stores one entry or type of the calibration metadata.

For camera systems having variable baseline (also known as interocular distance) and zoom, calibration is more difficult. Zoom magnifies small or difficult to see aspects of a scene by varying the focal length Changing the zoom increases the focal length of the lens, therefore changes the camera intrinsic calibration metadata. Baseline varies image depth to bring objects into focus and alter the perceived 3D effect generated by a 3D camera. At a high baseline setting, the perceived distance between the foreground and background elements of a scene is large therefore the perceived 3D effect is greater than images captured at a low baseline setting. Changing baseline requires moving the camera modules in a stereo camera system closer or farther apart. By physically changing the position of the camera modules, varying the camera's baseline impacts the stereoscopic calibration metadata.

In camera systems having adjustable baseline and zoom, the camera intrinsic calibration metadata and the stereoscopic calibration metadata must be determined at every baseline and zoom point within the range of adjustable baseline and zoom provided by the camera With a precise motors or other mechanical means responsible for manipulating the focal length and interocular distance of the cameras is numerous making calibration at manufacture time consuming and expensive. To make calibration of stereo camera systems with adjustable baseline and zoom practicable, a sequence of interpolation functions can be used.

To calibrate stereo camera systems having variable baseline and zoom, camera intrinsic calibration metadata and stereoscopic calibration metadata are calculated for a number of points within the zoom and baseline range of the camera. In one non-limiting example, at manufacture, sixteen calibration photos are taken at various positions within the range of baseline and zoom. The calibration positions may be equally spaced throughout baseline and zoom range with each photo taken at a different position and all photos taken at one of four zoom and baseline positions. For example, one photo at zoom position 0, baseline position 0; one photo at zoom position 0, baseline position 1; . . . ; one photo at zoom position 1, baseline position 0; one photo at zoom position 1, baseline position 1; . . . ; one photo at zoom position 4, baseline position 4.

From the sixteen calibration photos, camera intrinsic calibration metadata is calculated for each camera module. The stereoscopic calibration metadata describing the relative position between the camera modules is then determined based on the intrinsic calibration metadata and the position of reference objects, for example, corners of a chessboard, within photos captured at different baselines. Using an interpolation function, the known camera stereoscopic calibration metadata for at least one of sixteen calibration points can be used to calculate the camera intrinsic calibration metadata and the stereoscopic calibration metadata for any point within the zoom and/or baseline range of the camera. Alternatively, using an extrapolation function, the known camera stereoscopic calibration metadata for at least one of the eight points having the greatest zoom and/or largest baseline value can be used to calculate the camera intrinsic calibration metadata and the stereoscopic calibration metadata for any zoom and/or baseline greater than the largest zoom and/or baseline with known calibration metadata. The interpolation and/or extrapolation functions may be linear, bicubic, quadratic, or polynomial functions. In some embodiments, a CPU may perform the interpolation function operations. Other example systems perform interpolation operations using a GPU implementation.

Recalibration for Stereoscopic 3D Calibration Metadata

In most cases, the 3D calibration metadata for a particular stereoscopic device does not need to change after the device is manufactured and calibrated. However, the stereoscopic device may need re-calibration in some situations. For example, if the stereoscopic device is dropped to the ground or the mechanical mechanism used to manipulate the lens for zoom or change the interocular distance for baseline wears down. The distance between a lens and the image sensor behind the lens may be slightly changed or the movement of the lens closer to and away from the image sensor or the movement of one camera module to another may be altered. The stereoscopic device can perform a re-calibration process to generate the new 3D calibration metadata that corrects for the change in the position and/or function of camera system components.

In some embodiments, the stereoscopic device can re-calibrate itself when the device is capturing a 3D video. Using the content of the 3D video, including the differences between the left and right channels, the stereoscopic device can establish new 3D calibration parameters in real time. For example, a certain object in the video with sharply contrasted portions may act like a contrast-level calibration reference object for the stereoscopic device to conduct the automatic re-calibration. Alternatively, an object in the video may be known to have a rectangular shape, but appears to be curved due to the distortion. The stereoscopic device then can re-calibrate the distortion metadata by detecting the level of distortion on the curved image of the object. Alternatively, camera intrinsic calibration metadata or stereoscopic calibration metadata may be calculated in real time based on the relative positions of objects in image frames captured by the left and right camera modules. The re-calibrated 3D calibration metadata may be transmitted to the playback device in a real time, when the playback device replays the 3D video as the stereoscopic device captures the 3D video.

Embedding Stereoscopic 3D Calibration Metadata

In some embodiments, the 3D calibration metadata can be embedded into the 3D videos as metadata. For example, the stereoscopic device captures the 3D video into a recorded 3D video file and embeds the 3D calibration metadata into the 3D video file as metadata. These metadata can include, e.g., camera intrinsic parameters, parameters of each of the left and right lenses, parameters of each of the left and right image sensors, information about the inertial measurement unit (IMU), information about the accelerator, information about the gyroscopic device, device location information, zoom position information, baseline position information, image data, for example, a 3D image or rectified right and left image pairs, etc.

In some embodiments, the 3D calibration metadata can be saved in the metadata header of the 3D video file. Alternatively, the 3D calibration metadata can be saved in a subtitle channel or a closed caption channel in the video file. For example, the 3D calibration metadata can be saved in a foreign language subtitle channel that does not correspond to any real-world language.

In some embodiments, the 3D calibration metadata can be visually encoded into one or more frames of the 3D video file via, e.g., a video steganography process. In some embodiments, a graphic processing unit (GPU) can perform the video steganography process. With the steganography process, the 3D calibration metadata are stored in each frame of the 3D stereoscopic video. Any video playback software or video editing software can extract the 3D calibration metadata since the metadata embedded using steganography does not depend on the video format and always stays with the video frames.

It is desirable to embed the parameters about the camera, sensor, and processing directly into the video file recorded by the stereoscopic camera at the time of capture. Some of those parameters may be fixed for the duration of the video, such as image sensor and calibration parameters; while some parameters may change during the recording process, such as accelerometer, gyroscope, and GPS sensor readings.

In some embodiments, it is desirable that a player can read and process a video file that has been generated using the captured video of different stereoscopic cameras. For example, two users with different stereoscopic cameras may record scenes with their own devices, and then concatenate their respective videos into a single video file. In such a case, the stereoscopic video player will need to be able to associate different portions of the composite video file with different camera parameters, including different lens distortion parameters and image sensor parameters.

Accordingly, there is a need for a system or method that can embed the camera and sensor parameters into the video file captured by a stereoscopic 3D camera. Parameters will be either set once per the entirety of the file, or changed for each frame of the video. Additionally, there is a need for a system or method that can process such a stereoscopic 3D video file and decode the parameters, either fixed for the entirety of the file, or on a per frame basis. Such a system or method could then utilize the parameters during the playback of the video file.

VR Playback Using Stereoscopic 3D Calibration Metadata

During playback of the 3D video file, a playback device (e.g., a stereoscopic device disclosed herein or another device such as a computer, a smart phone, a VR headset or an HMD) can extract the 3D calibration metadata from the 3D video file. For example, the metadata can be extracted from the metadata header of the video file, or decoded from one or more frames of the video though a video steganography technique as a stereoscopic video player running on the playback device processes the video.

A stereoscopic video playback device can run a playback process to render a stereoscopic 3D video, such as a virtual reality ("VR") headset or a mobile phone having a stereoscopic or holographic display. In some embodiments, the functionalities and components of the stereoscopic video player can be included in the stereoscopic 3D video camera 100 as well. For example, the camera 100 can include a display screen 160 for playing back the 3D videos, as shown in FIG. 1.

Each of the stereoscopic frames is processed by the player, which may additionally require the parameters associated with the camera that captured the frames. For example, the player may require knowing details about the camera's image sensors and calibration metadata to properly render the stereoscopic frames. If the camera processed the video frames prior to the frames being encoded into the video file, the player may also need to know the parameters of the image processing algorithms that processed the frames.

Time stamp information may also be embedded into the image frame or encoded into the image file. Upon playback, the player may read the time stamp information to sequence the frames of a video stream and/or and associate one or more frames with one or more sets of calibration metadata. By reading the time stamp information and associating the frames with their corresponding time stamp information, the player can render the frame using the calibration metadata that corresponds to the frame even if the calibration metadata changes between frames in an image stream.

Figure 4:
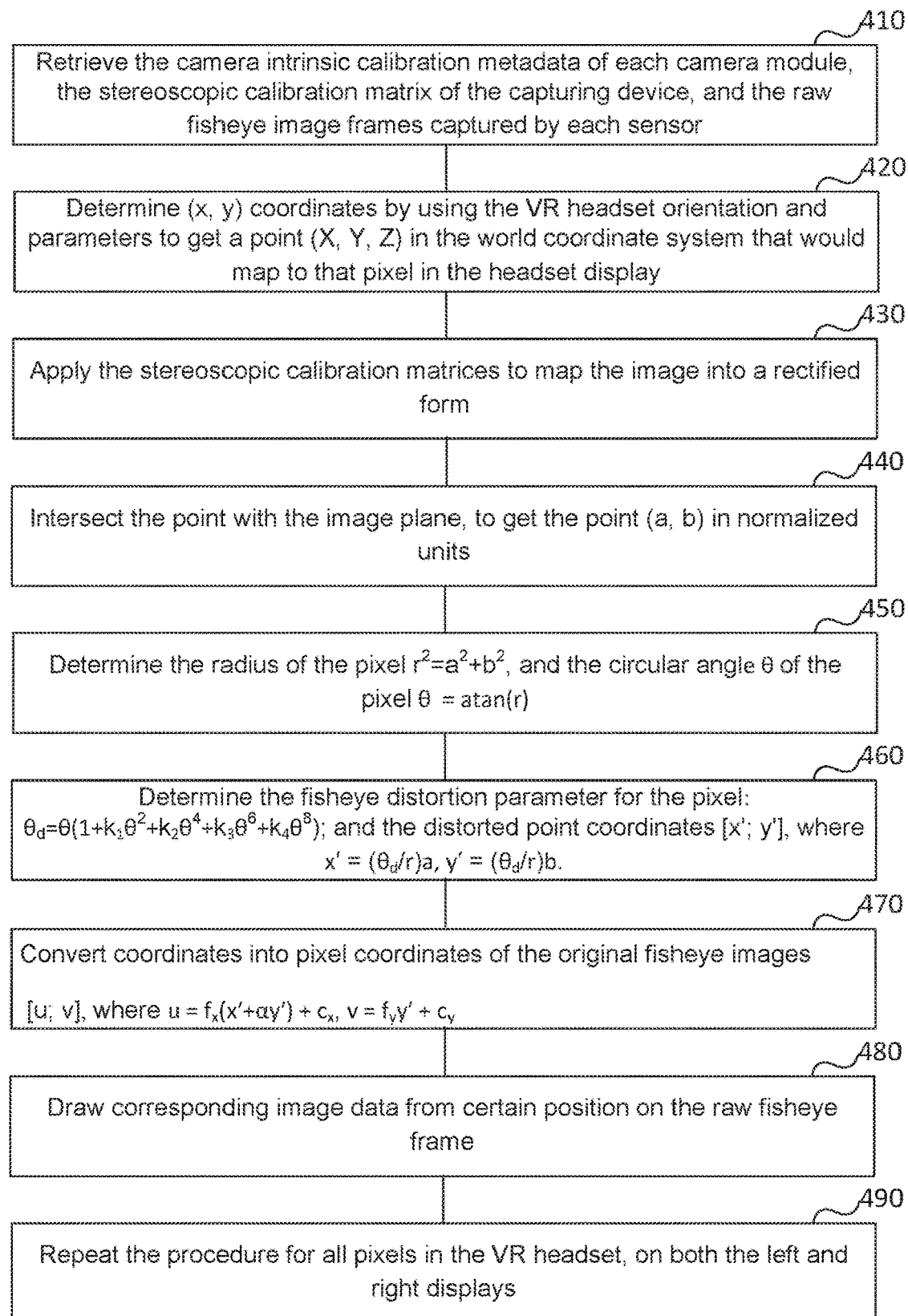
FIG. 4 shows a sample process of playing back a wide angle stereoscopic video using embedded calibration metadata.

FIG. 4 shows a sample process of playing back a stereoscopic video using embedded calibration metadata. At block 410, to render a stereoscopic 3D image (or a stereoscopic 3D video frame) onto a VR headset (or other playback device), the playback process retrieves the camera intrinsic calibration metadata of each camera module, the rectification and projection matrices of the capturing device (as stereoscopic calibration metadata), and the raw fisheye image frames captured by each sensor. In addition, the playback process may retrieve some parameters about the headset, such as its current orientation (e.g., represented by an orientation matrix), its field of view, and the offset between the two eye locations of the headset.

Rendering the frame is generally done pixel-by-pixel for each display pixel on the VR headset. To render each pixel of a frame displayed on the VR headset (also referred to as display pixel), the playback process identifies one or more corresponding pixels from the captured image frames (also referred to as image pixels or frame pixels). The playback process repeats the pixel-by-pixel rendering for both left and right channels until an the complete frame is rendered.

For each pixel, the playback process can use the headset's current orientation to determine the latitude and longitude of that pixel relative to center of the VR headset (also referred to as a head center location of the VR headset). The orientation can be described using, e.g., an orientation matrix or any equivalent description about the direction.

In some alternative embodiments, the playback process can use a pinhole camera model to intersect the pixel with the image plane, to get the pinhole camera model projected coordinates. The playback process can then use the position coordinates of that pixel to map it into the coordinates of the raw image. The pixels of the left VR display are mapped to the left camera module's image (left channel), and the pixels of the right VR display are mapped to the right module's captured image (right channel). For example, assuming (a, b) are the (x, y) coordinates of an original pixel, which are mapped onto the image plane, such that (0, 0) is the center of the image. At block 420, the playback process can determine (x, y) coordinates by using the VR headset orientation and parameters to get a point (X, Y, Z) in the world coordinate system that would map to that pixel in the headset display.

At block 430, the playback process can then apply the rectification matrices to this point, to map the image into a rectified form. In some embodiments, two rectification matrices describe the stereoscopic camera rectification: a rotation matrix (R) and a projection transform matrix (T). After the rectification using the rectification matrices, the rectified left and right channel frames are in the forms as though the frames were captured from the same image plane. The rotation matrix R is responsible for mapping the image planes of the left and right frames to be on the same plane. The projection matrix P is used to ensure that the left and right images are vertically aligned, and satisfy an epipolar geometry. In some embodiments, the left and right frames can be assigned their own rotation and projection matrices, R1, P1, and R2, P2, respectively, such that when applied the frames will be rectified to a common image plane that is halfway between the left and right planes. Coordinates from the unrectified left frame, for example, can be mapped to the rectified plane by pre-multiplying the coordinate by R*P. Similarly, the inverse of R*P can be used to map points from the rectified frame to an unrectified frame.

In some embodiments, rectification operations may be defined by a rotation matrix and a translation matrix. These matrices describe how to rotate and then translate one image frame to line it up with the other's plane. Algorithms, such as Bouguet's algorithm, can be used to convert the rotation and translation matrices into a rotation and projection matrix. Bouguet's algorithm, for example, is used to compute R and P while minimizing reprojection distortions and maximizing the common viewing area between the left and right frames.

At block 440, the playback process can then intersect the point with the image plane, to get the point (a, b) in normalized units. At block 450, the playback process determines the radius of the pixel which can be defined by the equation: $r^2=a^2+b^2$; and the circular angle $\theta$ of the pixel which can be defined as: $\theta=a\tan(r)$.

At block 460, for camera systems having a wide angle fisheye lens, the playback process determines the fisheye distortion parameter for the pixel: $\theta d=\theta(1+k_1\theta^2+k_2\theta^4+k_3\theta^6+k_4\theta^8)$; and the distorted point coordinates [x'; y'], where $x'=(\theta_d/r)a$, $y'=(\theta_d/r)b$.

At block 470, the playback process then can convert those coordinates into pixel coordinates of the original fisheye images. The final pixel coordinates are vector [u; v], where:

$$u=f_x(x'+\alpha y')+c_x$$

$$v=f_y y'+c_y$$

At block 480, with those final pixel coordinates, the playback process can draw corresponding image data from certain position on the raw fisheye frame. The [u, v] coordinates need not be integers. The playback process can use interpolation in the source fisheye image if the [u, v] coordinates are not integers. With those coordinates, the playback process pulls the [u, v] pixel from the fisheye image, and displays that pixel value on the VR headset at the original pixel point that is being rendered. At block 490, the playback process repeats this procedure for all pixels in the VR headset, on both the left and right displays. In addition, the playback process can update the pixels at the refresh rate of the headset. In some embodiments, the playback process can be performed efficiently by a graphics processing unit (GPU), though it could also be done on a central processing unit (CPU).

Stereoscopic 3D 360-Degree Stitching

In some embodiments, multiple cameras or stereoscopic devices can be combined together to capture the 3D image or 3D video in a super wide field of view (e.g., 360 degrees) simultaneously. Each stereoscopic device can capture the 3D image or 3D video at a wide field of view (e.g., 180 degrees) for both left and right channels.

Those simultaneously captured 3D videos can be combined together to create a virtual reality experience in 360 degrees. Combining images and/or frames captured from multiple viewing angles can also improve the accuracy and perceptibility of depth in image and/or video sequences viewed from different directions. In camera systems having a single stereoscopic device, depth is usually only visible when viewing a 3D image or video on a surface that is directly in front of (parallel to) the user's plane of view. If a user's perspective shifts in either direction so that they view the screen displaying the 3D image or video from the side at an angle then the depth of the 3D image or video is lost. Using multi-camera systems to capture scenes from many different angles can provide depth for 3D images and videos at any viewing direction.

The process of combining multiple images of a scene into one cohesive view or a series of cohesively sequenced images is called stitching. To maintain the stereoscopic effect, the left eye images captured by different devices (for a particular frame) can be stitched together, and the right eye images can be stitched together. The two stitched images can be used to regenerate the stereoscopic effect in 360 degrees and provide depth at multiple viewing angles.

Different calibration information is required to rectify and warp images taken at each angle. Therefore, multiple sets of 3D calibration metadata must be embedded into the stitched 3D videos. Each set of 3D calibration metadata corresponds to a channel of a 3D video captured by a lens and an image sensor pair within a stereoscopic device or multi-camera system.

Figure 5:
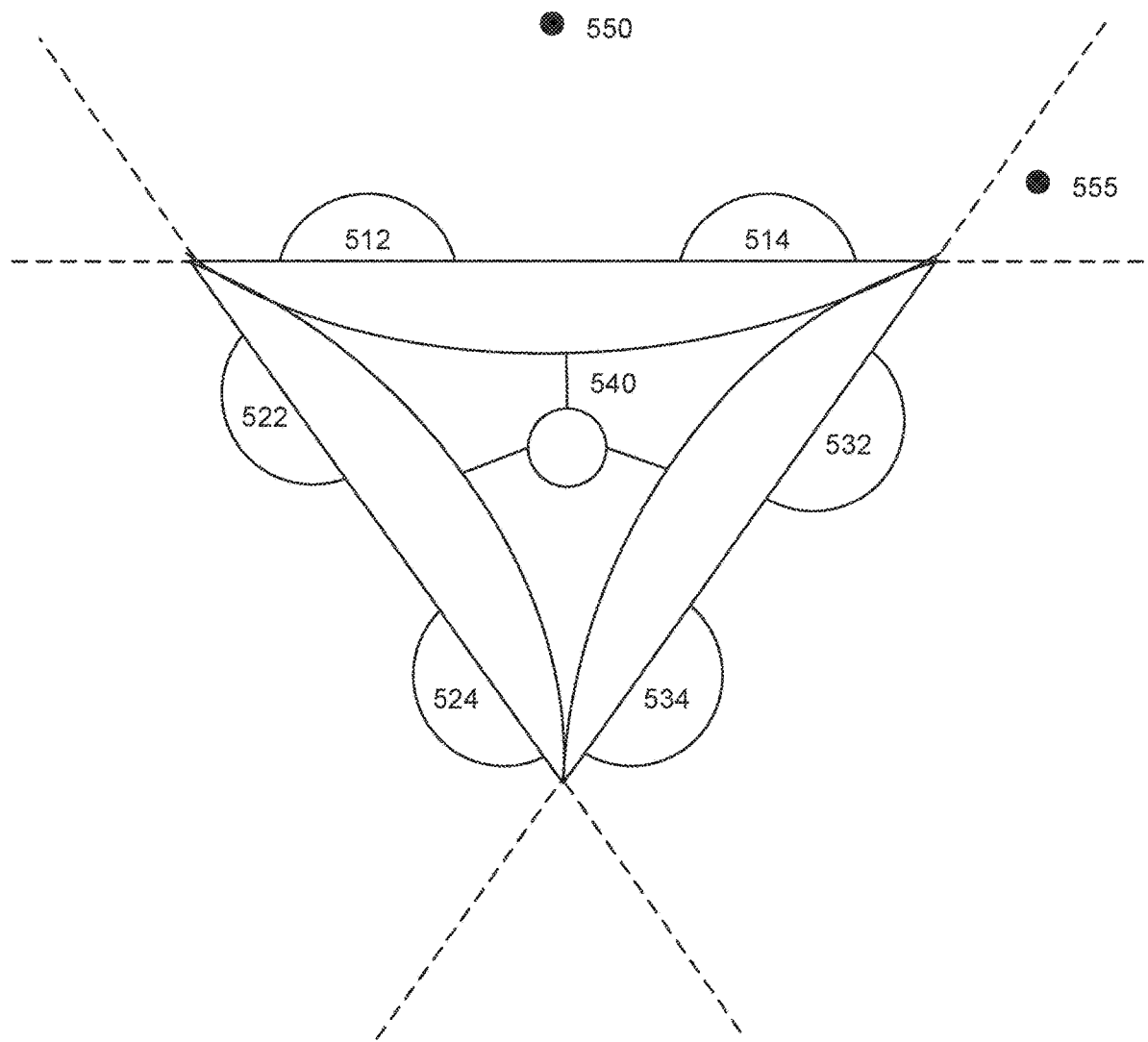
FIG. 5 shows multiple stereoscopic devices for capturing 3D videos from different directions simultaneously.

FIG. 5 shows multiple stereoscopic devices for capturing 3D videos from different directions simultaneously. Each of the stereoscopic devices 510, 520, 530 has a field of view of, e.g., 180 degrees. By combining the 3D videos captured by the three devices (totally 6 channels), a virtual reality of 360 degrees can be recreated.

During video capturing, three stereoscopic devices 510, 520, 530 can be mounted on a 360 rig mount 540 such the three stereoscopic devices 510, 520, 530 are facing three different directions. The 3D images or 3D videos captured by the lenses 512, 514, 522, 524, 532, 534 of the stereoscopic devices 510, 520, 530 can be stitched together to create a 360-degree virtual reality experience. For example, when a user moves the head at any orientation within the 360 degrees, the device plays back, in real time, a cropped portion of the 360-degree stitched 3D videos based on the head orientation and human vision field of view. Therefore, the user can experience a sense of presence in a 360-degree virtual environment based on the 360-degree 3D image or 3D video captured simultaneously by the three stereoscopic devices.

During the playback, depending on the orientation of the user head, the playback device might use multiple channels from one or more stereoscopic device to generate the left and right playback videos in real time. Thus, the playback device switches in real time between different sets of 3D calibration metadata, depending on the channels it currently uses for generating the playback videos. In some embodiments, the calibration using the 3D calibration metadata is performed on a frame-by-frame basis. Therefore, the 3D calibration metadata needs to be extracted in a real time in order to switch between the sets of 3D calibration metadata in real time.

For example, at a first time point during the playback of the combined 3D videos, the user's head is pointing toward a direction corresponding to the point 550 shown in FIG. 5. The playback device determines that at the first time point, only the left and right channels of the 3D video captured by the device 510 are needed in order to achieve the binocular stereoscopic effect and play back the current 3D VR videos for the eyes of the user. In other words, the device needs the 3D calibration metadata that relate to the device 510, including the lenses 512 and 514.

At a second time point during the playback of the combined 3D videos, the user head is pointing toward a direction corresponding to the point 555 as illustrated in FIG. 5. This time, the playback device determines that at the second time point, the device needs the right channel of the 3D video captured by the device 510 and the left channel of the 3D video captured by the device 530, in order to play back the current 3D VR videos for both eyes of user. In other words, the playback device leverages different reference points (with different perspectives) from lenses from different stereoscopic devices to achieve the binocular stereoscopic effect.

Thus, at the second time point, the device needs the 3D calibration metadata that relate to the device 510 (including the lens 514), as well as the 3D calibration metadata that relate to the device 530 (including the lens 532). Therefore, the playback device needs to switch between different sets of 3D calibration metadata in real time, depending on the 3D video channels on which the device currently relies for playing back the 3D VR video for the user.

The 3D effect at the point 555 might be less than the 3D effect at the point 550, because of the different perspectives of lenses and the fields of view. Generally, however, human eyes do not notice the diminishing 3D effect. This is because human eyes themselves have less 3D perception for their peripheral visions. Therefore, humans are used to the areas seen in their peripheral visions generally have less stereoscopic 3D effects.

Although FIG. 5 shows three devices, the technology can be applied to an arbitrary number of stereoscopic devices or camera modules. For example, two stereoscopic devices with 180 degrees can be used to recreate a 360-degree virtual reality experience, using the technology disclosed herein. Alternatively, 8 cameras with normal lenses having an angel of view between 80 and 114 degrees can be used to recreate a 360-degree virtual reality experience or provide depth for any angel of view.

Although FIG. 5 shows multiple devices for recording a combined 3D video for a field of view of 360 degrees, in some embodiments, the 3D effect of a field of view of 360 degrees can be achieved by a panoramic scan using a single stereoscopic device. For example, a user can use the stereoscopic device to capture a continuous sequence of stereoscopic 3D images by a panoramic scanning motion. By stitching the continuous sequences of stereoscopic 3D images together, a playback device can recreate a 3D image with a field of view of 360 degrees.

In order to stitch the images or video frames captured by different camera modules (including lenses and image sensors) of different capturing devices (e.g., 3D cameras), the 360 stitching process needs to read and otherwise interface with the calibration metadata of different camera modules and cameras. Each camera module has its unique set of camera intrinsic calibration metadata. In addition, each stereoscopic pair of lenses from a capturing device has its own stereoscopic calibration metadata. The 360 stitching process uses those metadata to avoid distortions, misalignment, and warping that are caused by the hardware variances of the lenses and capturing devices.

The 360 stitching process can first re-project each 180-degree stereo pair into a particular form, such as an equirectangular projection format. An equirectangular projection maps a sphere onto a rectangular image, such that the y coordinate is the latitude, and the x coordinate is the longitude, multiplied by a constant.

A 180-degree FOV image will only cover a portion of the recording sphere (half of it). When the image is converted to an equirectangular format, the equirectangular form of the 180-degree FOV image fills a portion of the recording sphere. Once all of the images from each sensor for a particular eye channel (left or right) have been converted to an equirectangular format (or other projection format, as desired), those images in the equirectangular format can be stitched together using image or video stitching algorithm as a 360-degree recording sphere image for left or right eye channel.

The procedure described in the previous VR playback section can be used for reprojection. For each pixel in the destination projection, the process can determine the latitude and longitude coordinates of the pixel based on the (x, y) coordinates of the image. The process can then apply the stereoscopic calibration and then camera intrinsic calibration, to map the point of the pixel onto the source normal or wide angle image. Thus, the process can reproject the original normal or wide angle image into a different format, such as an equirectangular projection. This process applies the calibration metadata, and converts the images into a standard projection. After the process, the calibration information is no longer needed for stitching. The 360 stitching can then be done on those standard projected images. Even though each original camera module had its own unique calibration settings, by reprojecting using the calibration metadata and then stitching, the images can now be stitched together without further calibration.

Sample Hardware Architecture

Figure 6:
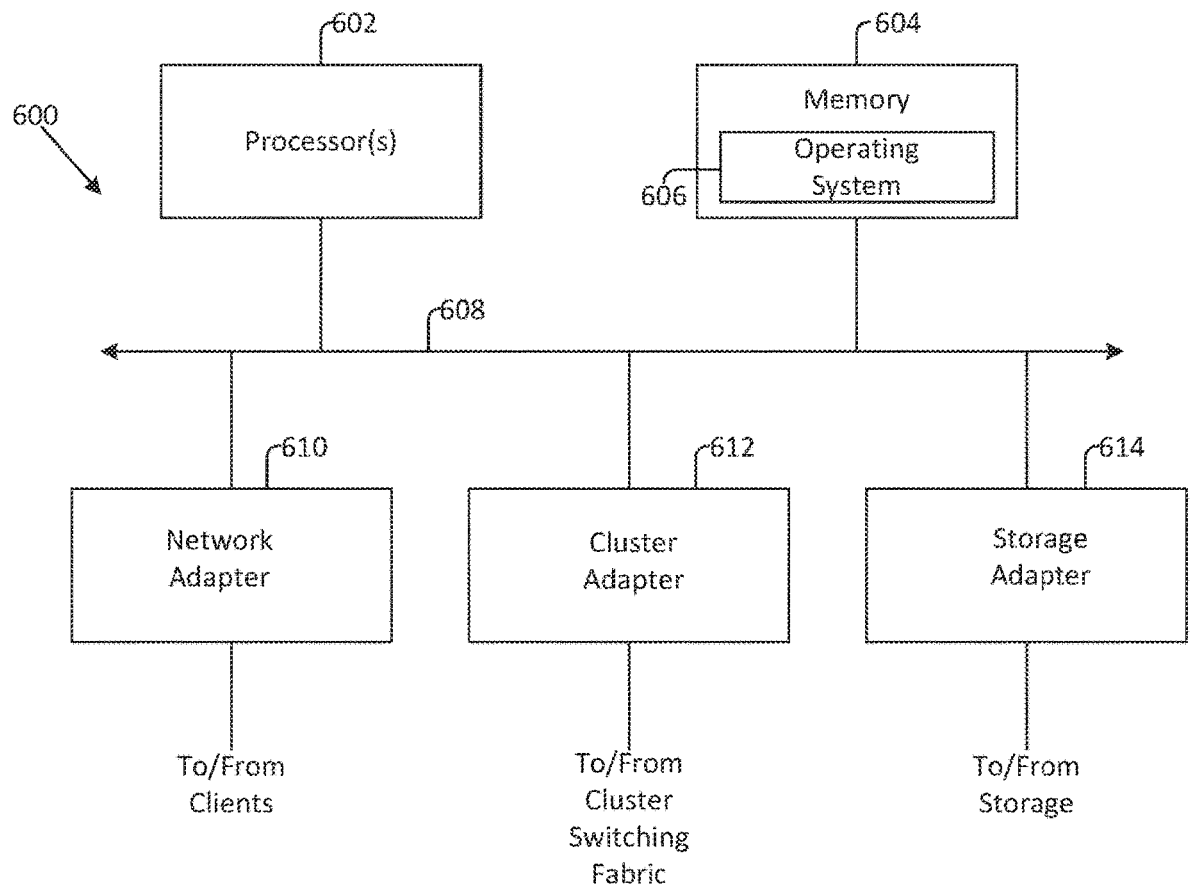
FIG. 6 is a high-level block diagram illustrating an example of a hardware architecture of a computing device that performs disclosed functionalities, in various embodiments.

FIG. 6 is a high-level block diagram illustrating an example of a hardware architecture of a computing device 600 that performs the above process, in various embodiments. The computing device 600 executes some or all of the processor executable process steps that are described below in detail. In various embodiments, the computing device 600 includes a processor subsystem that includes one or more processors 602. Processor 602 may be or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices.

The computing device 600 can further include a memory 604, a network adapter 610, a cluster access adapter 612 and a storage adapter 614, all interconnected by an interconnect 608. Interconnect 608 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (I9E) standard 1394 bus (sometimes referred to as "Firewire") or any other data communication system.

The cluster access adapter 612 includes one or more ports adapted to couple the computing device 600 to other devices. In the illustrated embodiment, Ethernet can be used as the clustering protocol and interconnect media, although other types of protocols and interconnects may be utilized within the cluster architecture described herein.

The computing device 600 can be embodied as a single- or multi-processor system executing an operating system 606 that can implement a high-level module, e.g., a manager, to logically organize the information as a hierarchical structure of named directories, files and special types of files called virtual disks at the storage devices. The computing device 600 can further include graphical processing unit(s) and/or neural processing unit(s). The graphical processing unit(s) are used for graphical processing tasks or processing non-graphical tasks in parallel. The neural processing unit(s) are optimized machine learning tasks involving image and/or sound processing routines for training neural networks and other machine learning models. Neural processing unit(s) may also process non-machine learning tasks in parallel.

The memory 604 can comprise storage locations that are addressable by the processor(s) 602 and adapters 610, 612, and 614 for storing processor executable code and data structures. The processor 602 and adapters 610, 612, and 614 may, in turn, comprise processing elements and/or logic circuitry configured to execute the software code and manipulate the data structures. The operating system 606, portions of which are typically resident in memory and executed by the processor(s) 602, functionally organizes the computing device 600 by (among other things) configuring the processor(s) 602 to invoke. It will be apparent to those skilled in the art that other processing and memory implementations, including various computer readable storage media, may be used for storing and executing program instructions pertaining to the technology.

The network adapter 610 can include multiple ports to couple the computing device 600 to one or more clients over point-to-point links, wide area networks, virtual private networks implemented over a public network (e.g., the Internet) or a shared local area network. The network adapter 610 thus can include the mechanical, electrical and signaling circuitry needed to connect the computing device 600 to the network. Illustratively, the network can be embodied as an Ethernet network or a Fibre Channel (FC) network. A client can communicate with the computing device over the network by exchanging discrete frames or packets of data according to pre-defined protocols, e.g., TCP/IP.

The storage adapter 614 can cooperate with the operating system 606 to access information requested by a client. The information may be stored on any type of attached array of writable storage media, e.g., magnetic disk or tape, optical disk (e.g., CD-ROM or DVD), flash memory, solid-state disk (SSD), electronic random access memory (RAM), micro-electro mechanical and/or any other similar media adapted to store information, including data and parity information. The storage adapter 614 can include multiple ports having input/output (I/O) interface circuitry that couples to the disks over an I/O interconnect arrangement, e.g., a conventional high-performance, Fibre Channel (FC) link topology. In various embodiments, the cluster adapter 612 and the storage adapter 614 can be implemented as one adapter configured to connect to a switching fabric, e.g., a storage network switch, in order to communicate with other devices and the mass storage devices.

Camera Systems Having Adjustable Camera Settings

Baseline, zoom, and focus are three widely used camera settings that greatly influence the customizability and quality of images captured by a camera device. The focus setting allows the camera device to sharpen the clarity of foreground or background objects thereby allowing users to select parts of a scene to capture clearly. Out of focus areas sometimes called blur or bokeh can also be processed to extract depth and other information from captured images. A zoom setting enables remote capture of objects at a distance by magnifying small or difficult to see aspects within a scene. In stereo vision systems, the baseline setting describes the interocular distance between the two camera modules. By effecting the depth range, baseline provides a mechanism for changing the perceived distance between the foreground and background elements of a scene. Image frames and video sequences captured with high baseline have a greater perceived 3D effect because of the increased depth between near and far objects.

Aspect ratio and camera relative rotation are addition camera settings that impact captured images. Aspect ratio describes the dimensions of the image frames captured by the camera device (e.g., 1920:1080 describing an image sensor that is 1920 pixels by 1080 pixels). Adjusting the aspect ratio setting impacts the portion of the image sensor used to generate an image and also effects image resolution. In stereo vision systems, the camera relative rotation setting describes the angle of rotation between the two camera modules. In one example, camera modules that are perfectly parallel to each other have an camera relative rotation setting of 0. Camera modules rotated 5° inward towards each other have a camera relative rotation setting of 5 and camera modules rotated 5° degrees outward away from each other have a camera relative rotation setting of (−)5. Adjusting the relative rotation setting by physically rotating the camera modules influences the location of the zero disparity plane (i.e. the distance at which the image planes of the left and right camera modules converge so that location of objects seen by each camera module is the same). Increasing the relative rotation setting brings the zero disparity plane closer to the camera modules. Conversely, decreasing the relative camera rotation moves the zero disparity plane further away from the camera modules or eliminates it completely by assuring the image planes of the left and right module never converge.

Small modifications of certain camera settings (e.g., baseline, zoom, focus, aspect ration, and relative camera rotation) can change the intrinsic and stereoscopic calibration metadata of a camera device. Calibrating a camera device at every possible camera setting is tedious and impractical especially if there is a wide range of possible values for a camera setting (e.g., having 10 cm of adjustable baseline with 1 mm of baseline difference between each baseline value) or many different camera settings incorporated in the camera device (e.g., a camera having adjustable baseline, zoom, and focus). Therefore, it is desirable to develop processes for determining calibration metadata at different camera setting values using a limited number of calibration points distributed over a few positions within the range of possible values for each camera setting. Camera settings also need to be rapidly adjustable and any changes made to the camera settings should cause real time changes in the appearance of images captured by the camera.

Some advantages of the methods of determining calibration metadata described herein include reducing the time and cost of the calibration process by minimizing the number of calibration points needed to derive calibration metadata at any camera setting value. Additionally, the methods of obtaining calibration metadata described herein are rapid enabling real time derivation of calibration metadata every time a camera setting changes. To increase the speed of calibration metadata derivations, the methods are suitable for implementation on a parallel processor such as a GPU or NPU.

Interpolation of Stereoscpoic Calibration Metadata

In one non-limiting example method of determining calibration metadata, calibration files including calibration metadata are assembled for a range of calibration points associated with different camera settings. The calibration points may be distributed evenly throughout the range of possible camera setting values to ensure at least one calibration point is in the vicinity of every possible value for a camera setting. The calibration metadata for each of the calibration points is measured during the calibration process to ensure accuracy. Interpolation functions are then applied to calibration metadata for calibration points having values for camera settings proximate to the real time values of the camera settings at a current camera position. Interpolated calibration metadata corresponding to the real time values of the camera settings is then used to rectify image frames for use in rendering a 3D display.

Figure 7A:
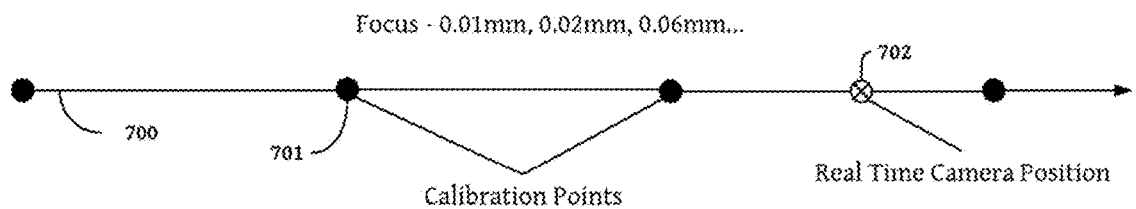
FIG. 7A is a sample calibration plot for determining stereo calibration parameters for camera systems having one camera setting.
Figure 7B:
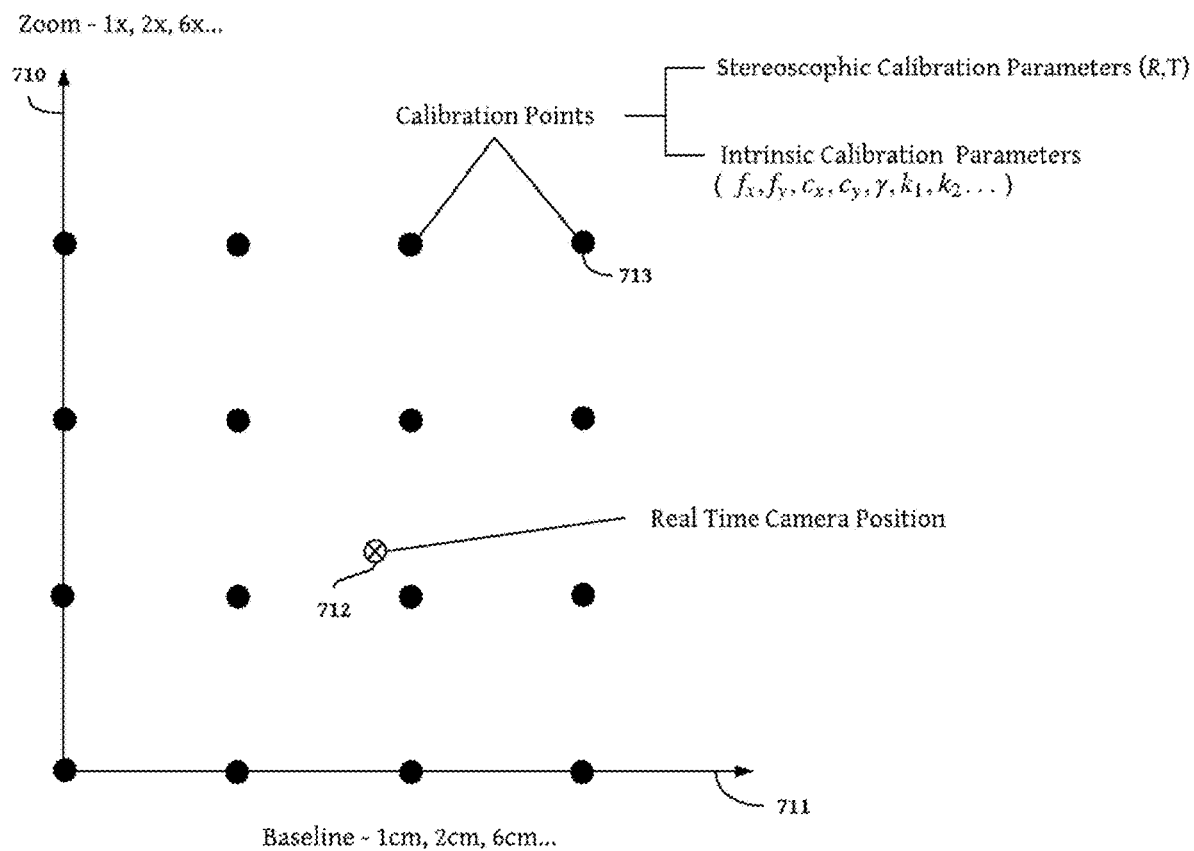
FIG. 7B is a sample calibration plot for determining stereo calibration parameters for camera systems having two camera settings.
Figure 7C:
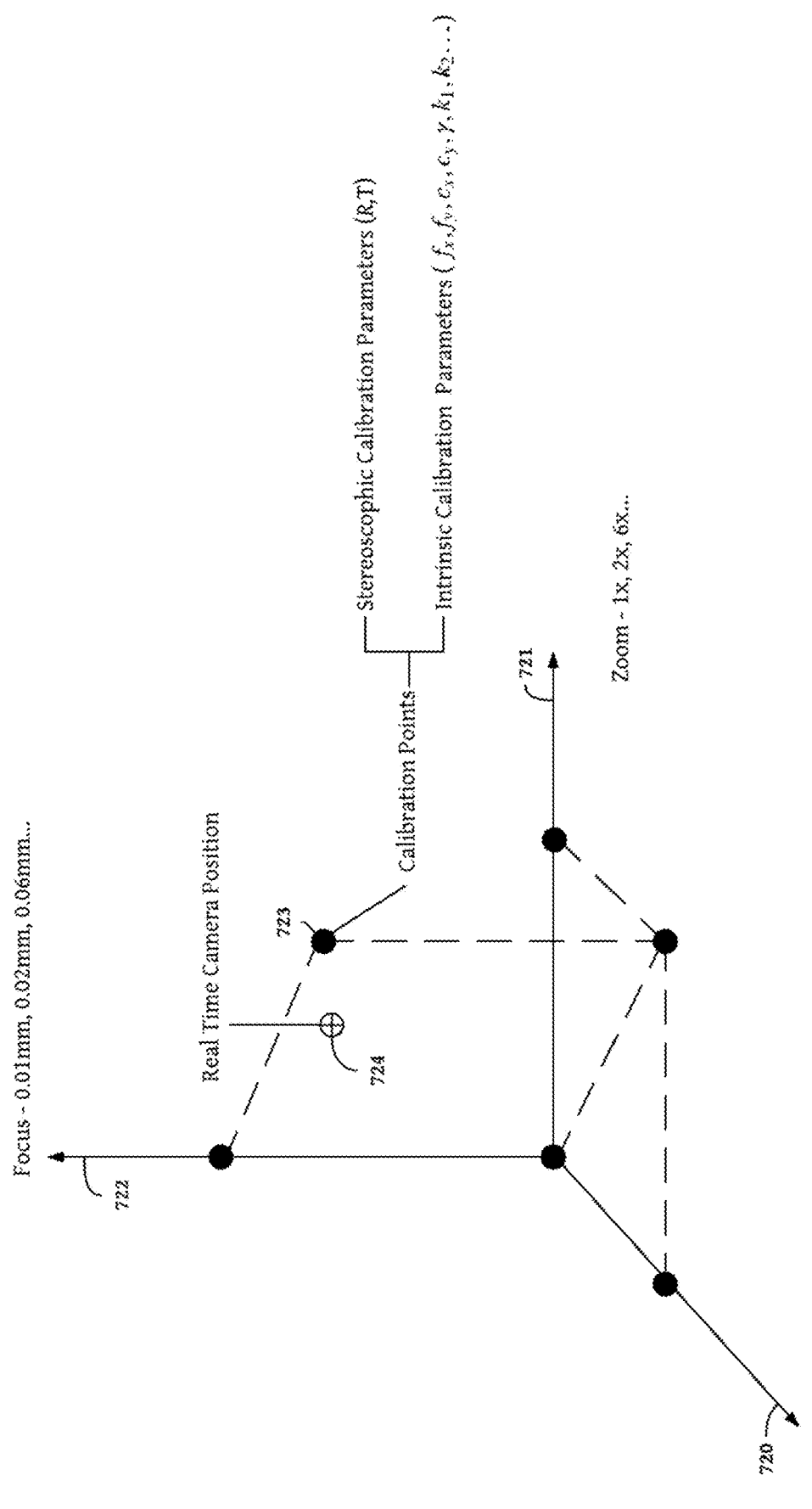
FIG. 7C is a sample calibration plot for determining stereo calibration parameters for camera systems having three camera settings.

Camera devices may have one or more camera settings. FIGS. 7A-7C illustrate example arrays of calibration points for cameras having one, two, and three camera settings. One possible single dimension array of calibration points is shown in FIG. 7A. Focus is the only camera setting in the camera system of this example and is shown on the x axis 700. Other camera systems may have baseline or zoom as the only camera setting. Each calibration point 701 shown on the x axis has a unique focus setting with the point on the far left positioned at focus setting 0 (e.g., 0.00 mm) and the focus setting on the far right positioned at focus setting 3 (e.g., 0.06 mm). The calibration points 701 may be linearly spaced so that equal increments of camera setting values separate each calibration point 701. Alternatively, the calibration points 701 may be non-linearly spaced with unequal increments of camera setting values separating each calibration point 701. In the example shown in FIG. 7A, the real time camera position has a focus setting between focus setting 2 (e.g., 0.02 mm) and focus setting 3 (e.g., 0.06 mm).

Camera devices having two camera settings may require additional calibration points because a few calibration points are needed with the range of values for each camera setting. One possible two dimensional array of calibration points is shown in FIG. 7B. In the figure, sixteen calibration points 713 are plotted in a two dimensional space with zoom 710 shown in the y dimension and baseline 711 shown in the x dimension. Other camera systems (e.g., mobile device cameras) may have zoom and focus as the two camera settings. Systems may also have focus and baseline as camera settings or, alternatively, any two of zoom, focus, baseline, aspect ratio, and camera relative rotation. Each of the sixteen calibration points 713 has unique values for baseline and zoom settings. In FIG. 7B, for example, the calibration point in the lower left has baseline setting 0 (e.g., 0 cm) and zoom setting 0 (e.g., 0×) and the calibration point in the upper right has baseline setting 3 (e.g. 10 cm) and zoom setting 3 (e.g. 10×). The real time camera position 712 is shown closest to the calibration point having baseline setting 2 (e.g., 2 cm) and zoom setting 1 (e.g., 1×).

Multi-camera systems having three or more camera settings may require more calibration points (e.g., 64) relative to cameras with only one or two camera settings. One possible three dimensional array of calibration points is shown in FIG. 7C. In the figure, calibration points 723 are plotted in a three dimensional space with baseline 720 shown in the x dimension, zoom 721 shown in the y dimension, and focus 722 shown in the z dimension. The real time camera position 724 is shown closest to the calibration point having baseline setting 1 (e.g., 1 cm), zoom setting 1 (e.g., 1×), and focus setting 1 (e.g., 0.01 mm). A camera device has distinct calibration metadata at every unique value for each camera setting (e.g., the calibration metadata is distinct for every unique combination of baseline, zoom, focus, and other camera settings). Therefore, each calibration point 723 has unique calibration metadata including distinct values for stereoscopic calibration parameters (collectively referred to as stereoscopic calibration metadata) and intrinsic calibration parameters (collectively referred to as intrinsic calibration metadata).

In one possible example, stereoscopic calibration parameters include a rotation matrix and a projection transform matrix (also referred to as a transformation matrix). The rotation matrix (R) is a matrix of n dimensions (e.g., 3×3) that maps the relative rotation between the left and right camera modules in three dimensions (X, Y, and Z). The rotation matrix is the product of three elemental rotation matrices describing the rotational offset in each dimension. In one example, the elemental rotation matrices include trigonometric functions of Euler angles quantifying the rotational offset between camera modules. The projection transform matrix (T) is a matrix of n dimensions (e.g., 3×1) that describes the vertical offset between left and right camera modules in three dimensions (X, Y, and Z).

Rectification and projection matrices for rectifying and warping image frames captured by the right and left image channels are generated from the rotation and projection transform matrices. Each image channel in a stereo camera or other multi-camera system has a unique set of rectification and projection matrices because manufacturing variations between the camera modules cause the rotational and vertical translation offsets to be different for every image channel. In stereo vision systems, rectification (R1, R2) and projection matrices (P1, P2) are generated for the right and left image channels from the rotation matrix (R) and projection transform matrix (T). The right rectification and projection matrices (e.g., R1, P1) rectify and warp the right image channel and the left rectification and projection matrices (R2, P2) rectify and warp the left image channel so that both images appear as if they were taken from the same image plane with no lens distortion.

Figure 13:
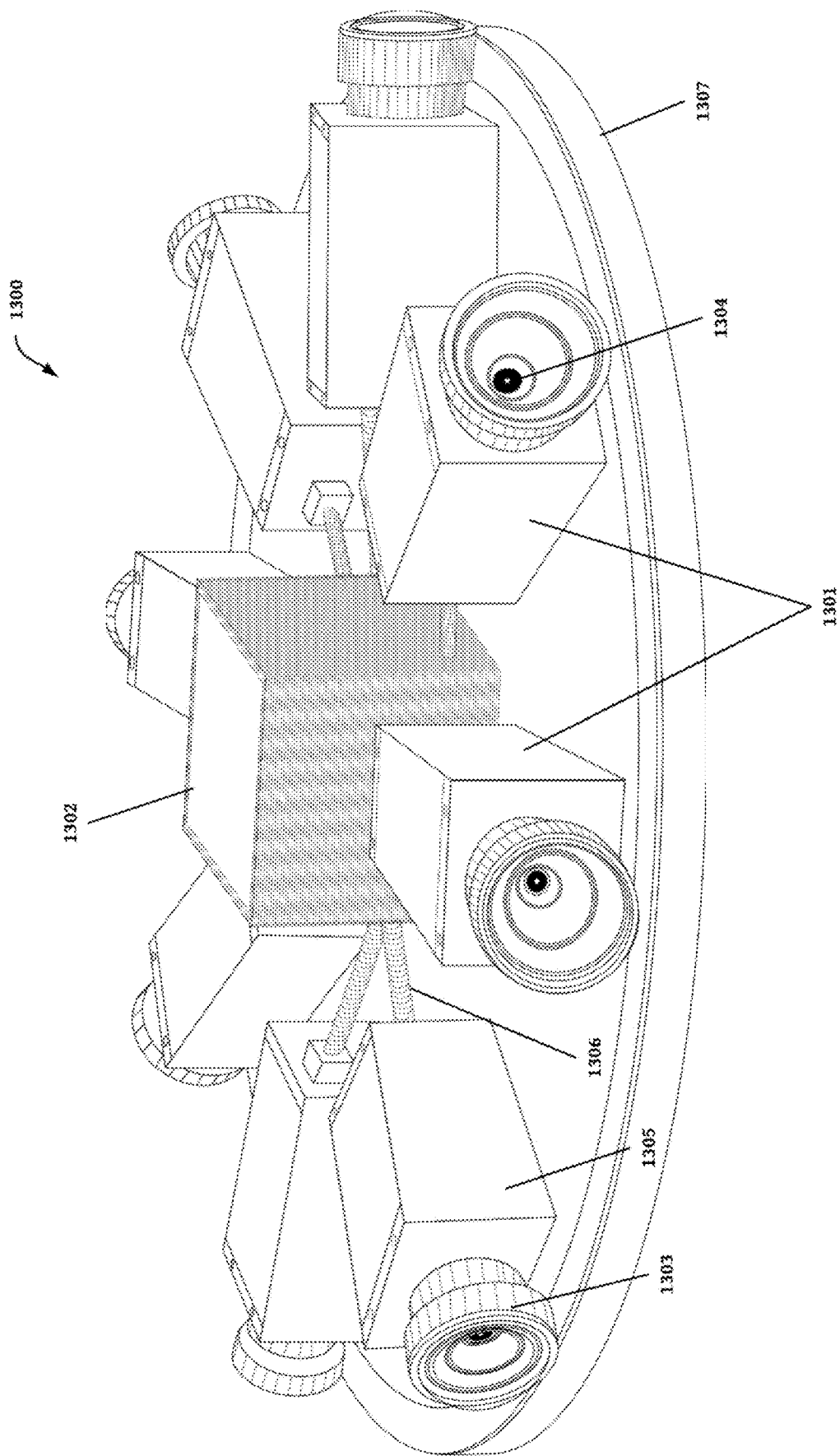
FIGS. 13 and 14 show an example multi-camera system having multiple camera settings.
Figure 14:
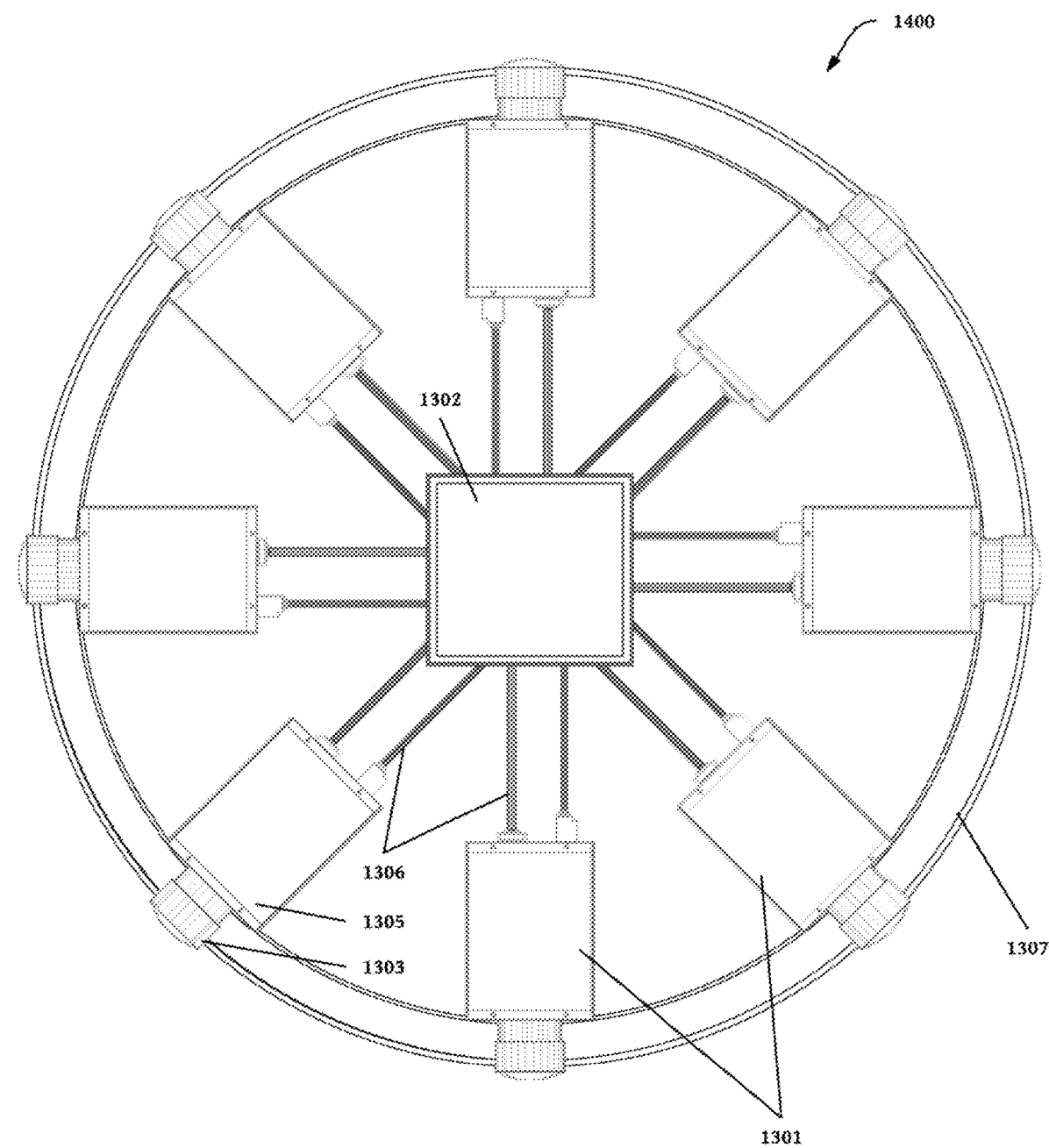

In multi-camera systems, a camera module may form a stereo pair with more than one camera module. Therefore, a single camera module may have multiple sets of rectification and projection matrices (e.g., a right rectification and projection matrix R1, P1 when paired with a left camera and a left rectification and projection matrix R2, P2 when paired with a right camera). FIGS. 13-14 illustrate one multi-camera embodiment with each camera module having multiple stereo pairs.

Intrinsic calibration parameters may include lens and image sensor properties, for example, focal lengths ($f_x$, $f_y$), distortion centers ($c_x$, $c_y$), skew coefficient between the x and y directions ($\gamma$), distortion coefficients (k1, k2, k3, . . . , kn), and other measurements related to the internal aspects of a camera module. In one possible example, intrinsic calibration parameters may be separated into a 3×3 floating point intrinsic calibration parameter matrix (K) having 5 unknown values ($f_x$, $f_y$, $c_x$, $c_y$, and $\gamma$) and a distortion vector (D) comprising between 1 and 16 distortion coefficients. Manufacturing variations cause each camera module in a stereo camera or other multi-camera system to have unique intrinsic calibration parameters.

In one example intrinsic calibration parameter matrix (K), the intrinsic calibration parameters may be arranged where:

$$K = \begin{bmatrix} f_x & \gamma & c_x \\ 0 & f_y & c_y \\ 0 & 0 & 1 \end{bmatrix}$$

In stereo calibration techniques, the intrinsic calibration metadata for each camera module may impact the stereoscopic calibration metadata for the camera device. Therefore, stereo calibration begins with determining the intrinsic calibration parameters for each camera module. Intrinsic calibration parameters are then used to generate a unique intrinsic calibration parameter matrix K and distortion vector D for the left and right image channels of a stereo camera. Based on the intrinsic calibration metadata (e.g., $K_R$, $K_L$, $D_R$, and $D_L$), the stereoscopic calibration metadata for the left and right camera modules (e.g., the rotation (R) and transformation (T) matrices) is determined. Using R and T, rectification and projection matrices are then generated for the right and left image channels. Image frames produced by each channel are rectified and warped using the rectification and projection matrices so that the left and right image frames appear as if they were captured from the same image plane.

When using a stereo camera it is desirable to move between different camera settings. Transitions between camera setting values should be smooth and precise. Additionally, to minimize manufacturing complexity and cost, the calibration process should be quick and easy. In one example method of determining calibration metadata for real time camera setting values not associated with a calibration point, calibration metadata for calibration points associated with a limited number of values for each camera setting is saved in memory. Calibration metadata for calibration points may be saved as a calibration file including calibration metadata for all calibration points or as a library of calibration files with each file including calibration metadata for a distinct calibration point. Applying an interpolation function to calibration metadata mapped to calibration points having camera settings proximate to the real time camera setting constructs a virtual calibration point having calibration metadata for the real time camera setting. For real time camera positions having multiple camera settings that do not map to a calibration point, one or more interpolation functions may be used to derive the real time calibration parameters corresponding to real time camera setting values. Single dimension and/or multi-dimension interpolation functions may be used to determine the real time calibration parameters for one or more real time camera settings based on the calibration metadata for the calibration points having camera setting values most proximate to the real time camera setting values.

For accurate rectification of stereo images captured over a range of camera settings, interpolation operations must be done every time one or more real time camera settings deviate from the camera settings at a calibration point. An interpolation operation must be done for each unknown calibration parameter. Depending on the parameters being interpolated and the difference between the real time camera setting values and the camera setting values associated with calibration points, interpolation functions may include one dimensional interpolation methods (e.g., one dimensional nearest neighbor interpolation, linear interpolation, or cubic interpolation) or multi-dimensional interpolation methods (e.g., two dimensional nearest neighbor interpolation, bilinear interpolation, bicubic interpolation, trilinear interpolation, or tricubic interpolation). Additionally, interpolation functions may include single-variate methods (i.e., methods yielding one unknown calibration parameter) or multi-variate methods (i.e., methods allowing simultaneous solving for two or more calibration parameters).

In one example interpolation method for determining calibration parameters for camera systems having two or more camera settings, a quadratic or triangular mesh grid containing values for calibration parameters mapped to calibration points associated with two or more camera settings is assembled from reading calibration file(s). The mesh grid may comprise a multi-dimensional space with one camera setting along each axis or dimension. The position of the real time camera setting values within the mesh grind is then located along with the three or four calibration points having the most proximate location within the mesh grid space (i.e. the most similar camera settings). Calibration parameters for the most proximate three or four calibration points is then input into a interpolation function to derive calibration parameters for the real time camera setting values. Each calibration parameter may be input separately into a calibration function (e.g., a three or four values for focal length x coordinate ($f_x$) input into a first interpolation function to derive the focal length x coordinate ($f_x$) for the real time camera settings, three or four values for focal length y coordinate ($f_y$) input into a second interpolation function to derive the focal length y ($f_y$) coordinate for the real time camera settings, and so on until all calibration parameters are derived). In this example, the same or different interpolation functions may be applied to the values for calibration parameter. Alternatively, values for two or more calibration parameters corresponding to the three or four calibration points with camera setting values most proximate to the real time camera setting values may be input into an multi-variate interpolation function to simultaneously derive two or more calibration parameters for the real time camera settings.

Methods of determining calibration parameters for camera systems having one camera setting are less complex because the value for the real time camera setting 702 is collinear to the calibration points 701. A single dimension (e.g., linear) interpolation function is used to derive the calibration metadata when the camera device has a real time camera setting value district from the camera setting values associated with calibration points. In examples with one camera setting, the total number of interpolations is equal to the total number of calibration parameters included in calibration metadata (e.g., 5 intrinsic calibration parameters in K, 3 intrinsic calibration parameters in D, 3 extrinsic calibration parameters in R, and 3 extrinsic calibration parameters in T for a total of 14 interpolations).

For camera systems with two camera settings and a real time camera position 712 having camera setting values located between four calibration points 713 (i.e. the real time position is not collinear to any known calibration points) one or more single dimension interpolation functions or one multi dimensional interpolation function per calibration parameter may be used to derive the calibration metadata for the real time camera settings. In one example, if a series of single dimension interpolation functions are used, the total number of interpolations may be equal to the number of uncalibrated real time camera setting values (e.g., 2) times the number of unknown calibration parameters (e.g., 14 for a total of 28 interpolations). One linear interpolation function is needed per dimension (i.e., camera setting) because these methods rely on first dividing the two dimensional array of calibration points into two one dimensional arrays. Examples, using multi-dimension interpolation functions may reduce the total number of interpolations by a factor of 2 so that the number of interpolation operations equals the number of unknown calibration parameters (e.g., 14).

Figure 8C:
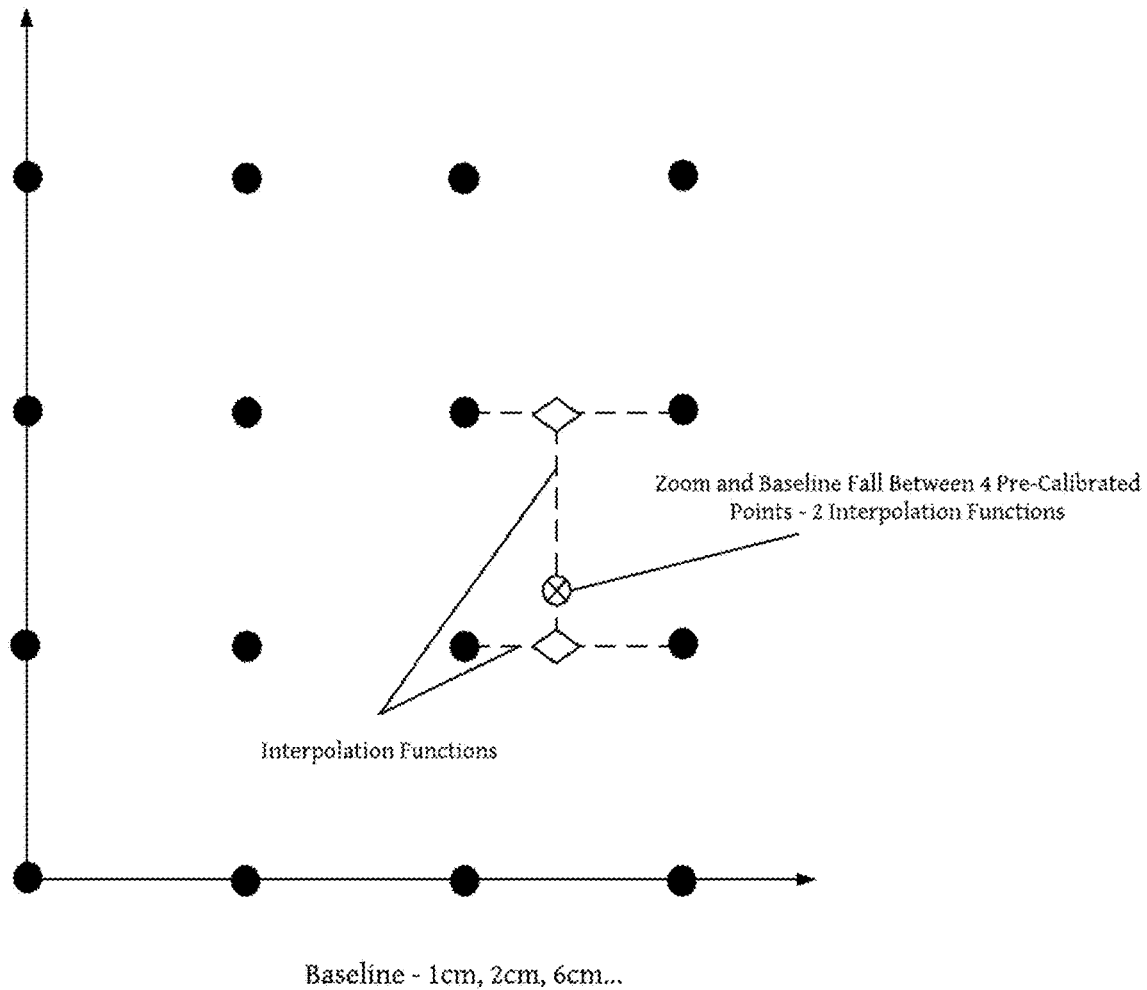
FIG. 8A though 8C show interpolation methods for determining stereo calibration parameters for a camera system having two camera settings.
FIG. 8D though 8E show one example interpolation method for determining stereo calibration parameters for a camera system having three camera settings.

FIGS. 8A-C describe the interpolation process for camera systems having two camera settings in more detail. FIG. 8A shows a camera real time position directly on one of the calibration points having measured calibration metadata. To determine the camera intrinsic calibration parameters and stereoscopic calibration parameters for cameras in this position, no interpolation operations are needed. Instead, the calibration metadata for the calibration point mapping to the real time values for the camera settings (e.g., baseline and zoom) is used to generate the rectification (R1, R2) and projection matrices (P1, P2) needed to rectify and warp the left and right image channels.

FIG. 8B shows a camera real time position having values for real time camera settings between the camera setting values at two known calibration points. In this example, the real time position of the camera falls between a first calibration point having a baseline setting 2 (e.g., 2 cm) and zoom setting 1 (e.g., 1×) and a second calibration point having a baseline setting 3 (e.g., 6 cm) and a zoom setting 1 (e.g., 1×). To determine the calibration metadata at this position, an interpolation function may be used to generate each intrinsic and stereoscopic calibration parameter. The interpolation function takes as input a calibration parameter for the first calibration point and a corresponding calibration parameter for the second calibration point (i.e. $f_x$ for the first calibration point and $f_x$ for the second calibration point). By performing a sequence of interpolation operations on the set of calibration parameters, the real time calibration parameter (i.e. $f_x$ for the virtual calibration point mapping to the real time camera setting) is generated as output. The same interpolation process is then repeated for each intrinsic and extrinsic calibration parameter included in the calibration file(s).

In this example, the camera real time position falls between two calibration points having a the same zoom and/or focus settings. Absent a change in zoom and/or focus, the intrinsic calibration parameters (e.g., focal lengths, distortion centers, and distortion coefficients) may remain constant or may only change by a negligible amount. Therefore, it may be possible to determine real time calibration parameters for the camera real time position by interpolating the between the stereoscopic calibration parameters (e.g., R and T) for the calibration points having the camera settings most proximate to the real time camera settings. In some cases changing baseline may physically shift the camera modules, therefore, changing the baseline setting absent any change in value for the zoom and/or focus setting may still require interpolating both the camera intrinsic parameters and the stereoscopic calibration parameters for the calibration points having camera setting values most proximate to the real time camera settings.

Another possible optimization may be available when only the value of a intrinsic parameter dependent camera setting (e.g., zoom or focus) changes and baseline remains constant. In some cases, keeping the same value for the baseline setting ensures the stereoscopic calibration points remain constant. Therefore, it may be possible to determine real time calibration parameters for the real time camera position by interpolating between the intrinsic calibration parameters (e.g., focal lengths, distortion centers, and distortion coefficients) for the calibration points having the camera settings most proximate to the real time camera settings. In some situations, changing the focus or zoom impacts the stereoscopic calibration parameters, therefore, changing the value of the zoom and/or focus setting absent any change in value for the baseline setting may still require interpolating both the camera intrinsic parameters and the stereoscopic calibration parameters for the calibration points having camera setting values most proximate to the real time camera settings.

FIG. 8C shows a real time camera position having values for two camera settings that fall between the camera setting values at four calibration points. In this example, the values for the real time camera settings at the real time camera position are between a first calibration point having a baseline setting 2 (e.g., 2 cm) and a zoom setting 1 (e.g., 1×); a second calibration point having a baseline setting 3 (e.g., 6 cm) and a zoom setting 1 (e.g., 1×); a third calibration point having a baseline setting 2 (e.g., 2 cm) and a zoom setting 2 (e.g., 2×); and a fourth calibration point having a baseline setting 3 (e.g., 6 cm) and a zoom setting 2 (e.g., 2×).

To determine the calibration metadata for a virtual calibration point having values for real time camera settings between the camera setting values at four calibration points, a sequence of two interpolation functions may be used. A first interpolation function generates two intermediate calibration points by interpolating calibration metadata in the x dimension between the first and second calibration points and the third and fourth calibration points. The intermediate calibration points map to intermediate calibration metadata (e.g., intermediate intrinsic calibration parameters and intermediate extrinsic calibration parameters) and are collinear to the virtual calibration point having values for real time camera settings that correspond to the real time camera position. A second interpolation function then interpolates in the y dimension between the intermediate calibration parameters at the intermediate calibration points to generate real time calibration metadata for the real time camera position having real time camera settings. The sequence of interpolation functions must be performed for each calibration parameter every time the real time camera position has at least one real time camera setting value that does not correspond a camera setting value associated with a calibration point.

Alternatively, a multi-dimensional interpolation function (e.g., bilinear interpolation) may be used to interpolate between the four calibration points. One implementation of a multi-dimensional interpolation function multiplies the product of linear interpolations in the x and y directions to generate a final output. A second multi-dimensional interpolation function generates a mesh grid space having calibration points oriented according to their associated camera setting values within a multi-dimension space with one camera setting in each dimension. The real time camera settings are used to locate the area of the mesh grid containing the real time camera position and the most proximate calibration points. Values for a calibration parameter at the most proximate calibration points are input into an interpolation function to derive the calibration parameter at the real time camera settings. One example interpolation function determines the value of the calibration parameter at the real time camera settings by weighting the calibration parameter values of the most proximate calibration points (i.e. the calibration parameter value at the closest calibration point is weighted more heavily than the calibration parameter values at proximate calibration points that are further away from the real time camera position). The multi-dimensional interpolation function is applied to each calibration parameter to generate a complete set of real time calibration metadata. Other implementations of bilinear interpolation use barycentric coordinates to interpolate between three calibration points within a triangle. Relative to a sequence of linear or other one dimensional interpolation functions, a multi-dimensional interpolation function may be used to calculate the real time camera position with more accuracy, in less time, and/or with fewer computational resources. Regardless of the dimensionality or type of interpolation function used, the camera settings and calibration parameters must be interpolated for every unknown calibration parameter.

Figure 8D:
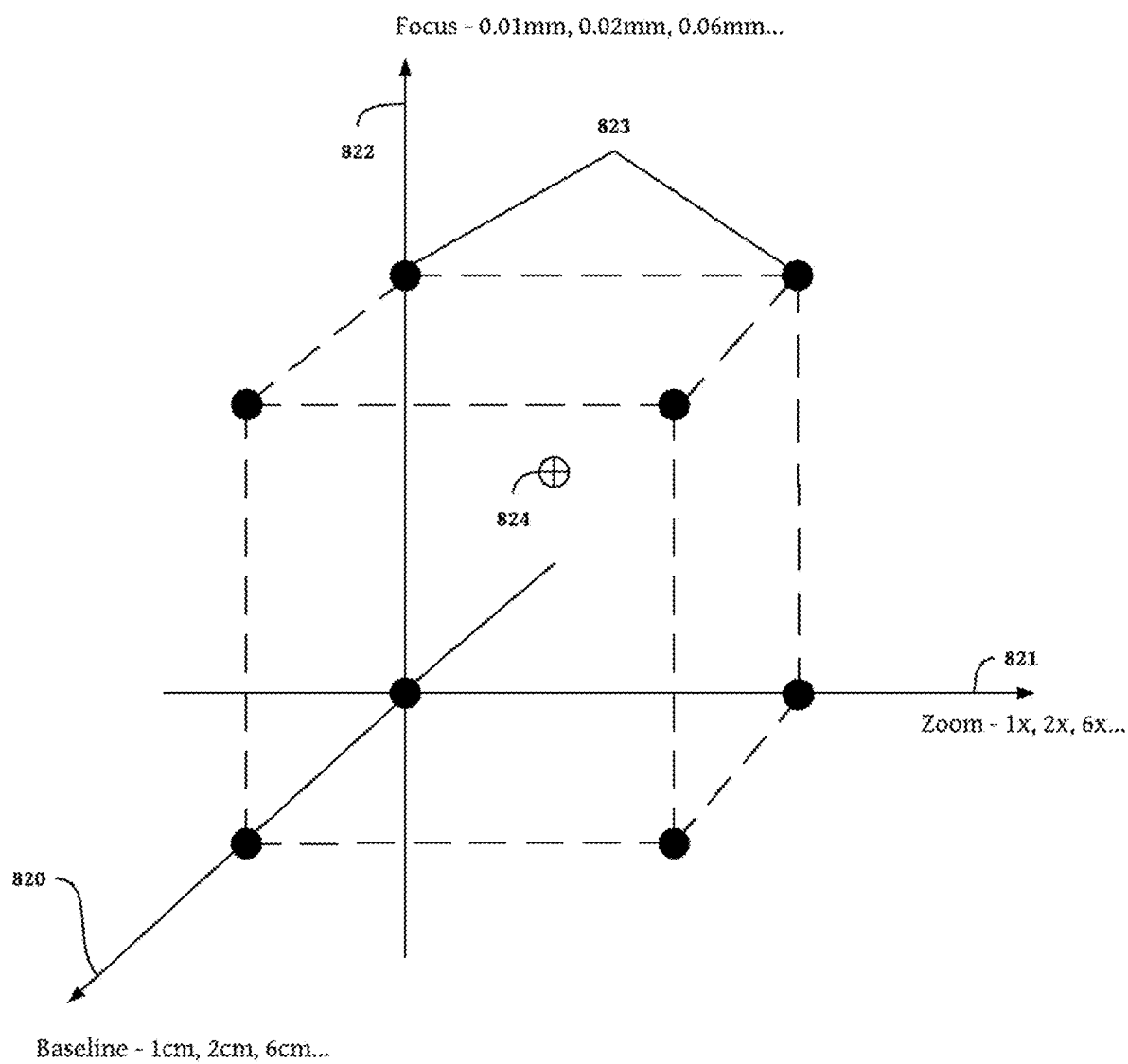

Camera systems having three camera settings (e.g., baseline, zoom, and focus) may have real time camera positions that fall between eight calibration points. In the example shown in FIG. 8D, the real time camera position 824 falls between a first calibration point 823 having a baseline setting 0 (e.g., 0 cm), a zoom setting 0 (e.g., 0×), and a focus setting 0 (e.g., 0 mm); a second calibration point having baseline setting 1 (e.g., 1 cm), zoom setting 0, and focus setting 0; a third calibration point having baseline setting 1, zoom setting 1 (e.g., 1×), and baseline setting 0; a fourth calibration point having baseline setting 0, zoom setting 1, and focus setting 0; a fifth calibration point having baseline setting 0, zoom setting 0, and focus setting 1 (e.g., 0.01 mm); a sixth calibration point having baseline setting 1, zoom setting 0, and focus setting 1; a seventh calibration point having baseline setting 1, zoom setting 1, and focus setting 1; and an eighth calibration point having baseline setting 0, zoom setting 1, and focus setting 1.

To calculate the real time calibration metadata for the real time camera position 824 it may be possible to apply a sequence of three linear interpolations. The interpolation sequence derives real time calibration parameters from the calibration parameters for calibration points having camera settings most proximate to the real time camera settings. Intermediate calibration points having intermediate calibration metadata at the correct focus setting, zoom setting, and baseline setting may be computed separately using a linear interpolation function then mathematically combined (e.g., by multiplying the product of each linear interpolation). Any combination of one dimensional interpolation functions (e.g., one dimensional nearest neighbor, linear, cubic, or polynomial interpolations) may be combined to derive real time calibration parameters for a real time camera position having three or more real time camera settings.

Figure 8E:
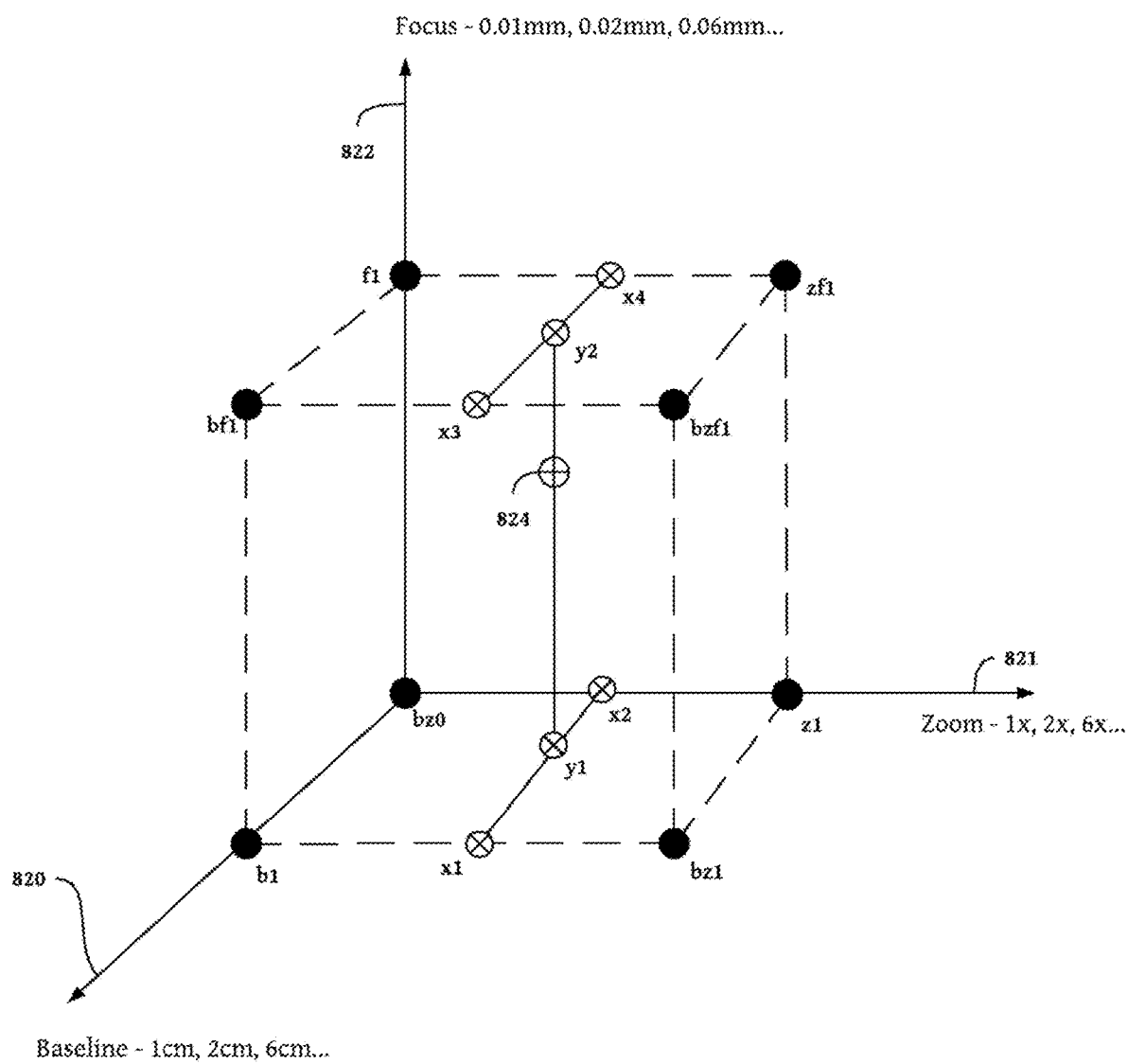

Alternatively, a multi-dimensional interpolation function may be used to interpolate between the calibration point mappings of the camera settings to the calibration parameters. In one example, a trilinear interpolation method may be used to approximate the real time calibration parameter values at a real time camera position 824 between eight calibration points by preforming multivariate interpolation on a 3 dimensional regular mesh grid. In one example, a trilinear interpolation is identical to two bilinear interpolations combined with a linear interpolation. As shown in FIG. 8E, a trilinear interpolation function for determining real time calibration parameters at a real time camera position 824 between eight calibration points involves first interpolating the calibration parameter values for the proximate calibration points along the x dimension (e.g., zoom) on b1, bz1 to get x1; on bz0, z1 to get x2; on bf1, bzf1 to get x3; and on f1, zf1 to get x4. A first bilinear interpolation is then performed along the y dimension (e.g., baseline) on the first set of intermediate calibration points generated by the first liner interpolation function (e.g., x1, x2 and x3, x4) to get a y1 and y2. Lastly, a second bilinear interpolation is performed along the z dimension (e.g., focus) on the second set of intermediate calibration points generated by the second bilinear interpolation (e.g, y1, y2) to get the real time calibration values at the real time camera position 824.

Other multi-dimensional interpolation functions (e.g., bicubic, tricubic, bipolynomial, or tripolynomial) may be used interpolate calibration parameters in systems having three or more camera settings. A multi-dimensional interpolation function may be used to calculate the real time calibration parameters with more accuracy, in less time, and/or with fewer computational resources relative to a sequence of linear or other one dimensional interpolation functions. Absent an optimization available when only one of two or camera settings changes and regardless of the dimensionality or type of the interpolation function used, each calibration parameters must be interpolated to generate a complete set of real time calibration metadata.

Single and multi-dimensional interpolation functions can be implemented for execution on CPU, mobile CPU, GPU, mobile GPU, NPU, and/or mobile NPU processors. GPU implementations may leverage a hardware acceleration functionality that performs interpolation operations significantly faster, with greater computation parallelization, with less power consumption, and/or using less explicit program instructions relative implementations on a general purpose CPU. Example GPU implementations may be written in C, C++, or a shading language (e.g., OpenGL Shading Language). These implementations may incorporate a helper-function that returns an interpolation between two inputs for a parameter in the closed unit interval. In one non-limiting example, single dimensional interpolation functions may include one dimensional nearest neighbor, linear, cubic, or polynomial interpolations. Non-limiting examples of two dimensional interpolation functions include two dimensional nearest neighbor, bilinear, bicubic, or bipolynomial interpolations. Non-limiting examples of other multi-dimensional interpolation functions include bicubic, tricubic, bipolynomial, or tripolynomial interpolations.

Sample Software Implementation

Figure 9:
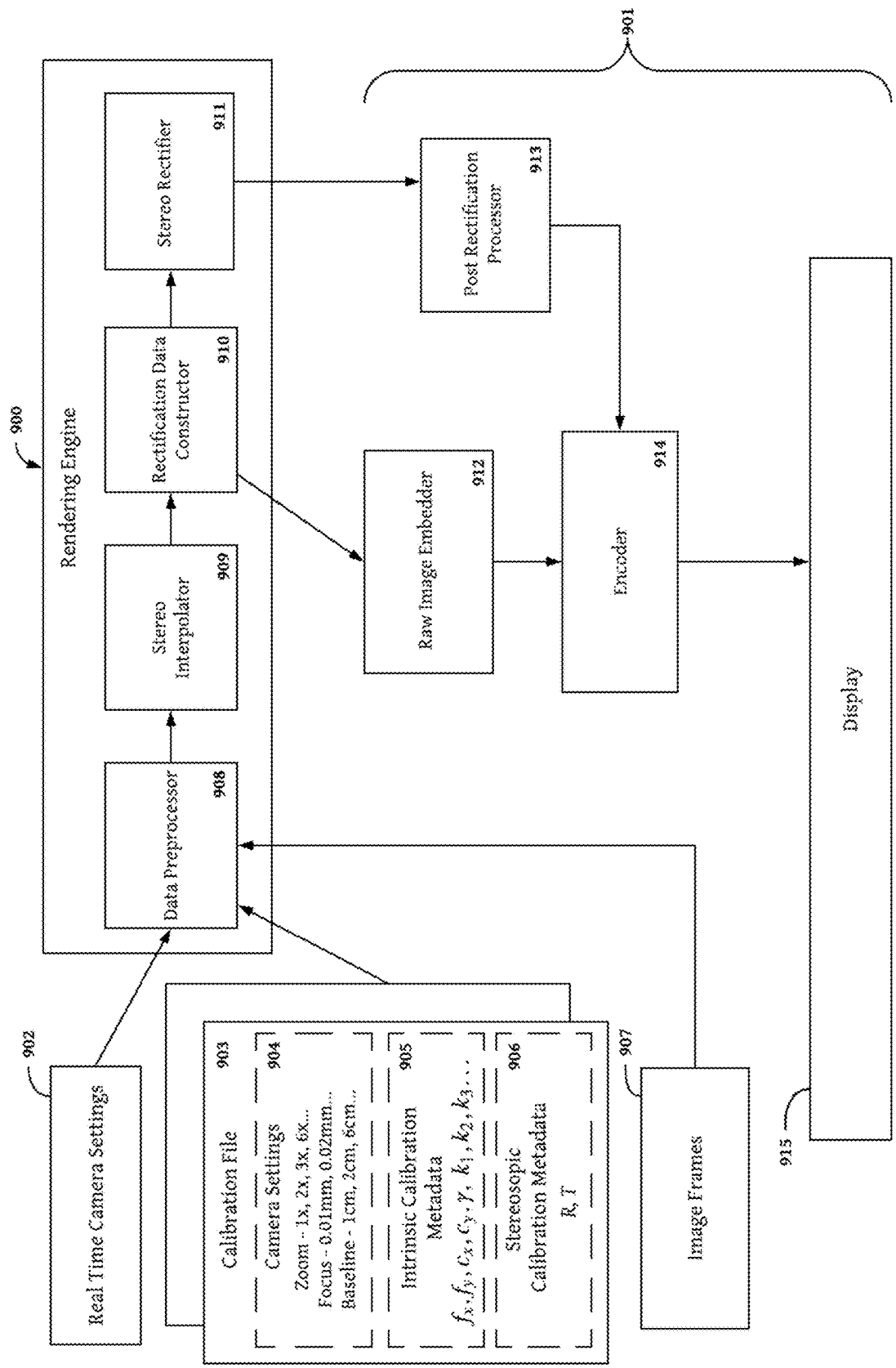
FIG. 9 is a high-level block diagram illustrating elements of an example stereo image rectification and 3D rendering system for generating 3D images and video.

FIG. 9 is a block diagram that schematically shows details of a stereo image rectification and 3D rendering system including a rendering engine 900 and a playback pipeline 901. In one non-limiting example, the stereo image rectification and 3D rendering system 900 processes calibration file(s) 903, real time camera settings 902, and raw image frames 907 to generate calibrated and rectified 3D image frames and video sequences for display on a computer device (e.g., a mobile device or HMD).

Calibration metadata including intrinsic calibration metadata 905 and stereoscopic calibration metadata 906 may be arranged in one calibration file 903 having calibration metadata for all calibration points. Alternatively, calibration metadata may be organized as a library of calibration files, with each file 903 including calibration metadata for one calibration point. In either arrangement, calibration points and their corresponding calibration metadata are associated with camera settings 904 (e.g., zoom focus, baseline, aspect ratio, relative camera rotation, resolution white balance, shutter, iris, stabilizer, and gain) describing the configuration of the camera device at each calibration point. One possible calibration file 903 implementation includes intrinsic calibration metadata 905 and stereoscopic calibration metadata 906 measured for sixteen or more calibration points. Intrinsic calibration metadata 905 may include camera calibration metadata (e.g., focal length, distortion centers, and x and y skew) and distortion coefficients (e.g., $k_1$, $k_2$, $k_3$, ..., $k_n$). Stereoscopic calibration metadata 906 may include rotation and transformation matrices (e.g., R, T).

The calibration file(s) 903 are stored in memory and read by the data preprocessor 908 as part of one or more routines for determining real time calibration metadata from a limited number of calibration points. Additional information received by the data preprocessor 908 as part of a routine for deriving real time calibration metadata includes real time camera settings 902 and raw image frames 907 or video sequences. A control circuit implemented on a camera device board controls the real time camera settings 902. In one example, the real time camera settings 902 are stored in a data buffer provided by memory resources included in the camera device control board. The data preprocessor 908 may read or otherwise receive values for the real time camera settings 902 from this data buffer. Example real time settings 902 include the current baseline (e.g., 1 cm, 2 cm, and 6 cm), zoom (e.g., 1×, 2×, and 6×), and focus (e.g., 0.01 mm, 0.02 mm, and 0.06 mm) settings of a camera. Raw image frames 907 or video sequences captured by the left and right image sensors may be stored in and read from camera device memory by the data preprocessor.

After aggregating the calibration file(s) 903, raw image frames 907, and real time camera settings 902, one or more preprocessing operations may be performed by the data preprocessor 906. Example preprocessing operations include using one or more normalization functions to shift or rescale aggregated data (e.g., real time camera settings and calibration metadata) to a notionally common scale (e.g., 0 to 1). In one possible implementation, the data preprocessor 906 normalizes one or more calibration parameters by dividing parameter values by the pixel values for a camera video mode (e.g., for a 1080p video mode having a 1920× 1080 pixel resolution, dividing the x coordinates of the distortion centers and focal lengths by 1920 and the y coordinates of the distortion centers and focal lengths by 1080). This normalization operation makes the rendering engine 900 compatible with video modes having any selected resolution. When the desired resolution has the same aspect ratio (e.g., 16:9) normalization may be done during the calibration phase so that normalized values for calibration parameters are included in the calibration file(s) 903. Alliteratively, resolutions having different aspect ratios (e.g., 1440×1080 pixels with a 4:3 aspect ratio) require normalization in real time because of the image sensor offset of the new aspect ratio relative to original aspect ratio. Normalized aggregate data may be written in memory and read by other components of the rendering engine 900 (e.g., the stereo interpolator 907) in advance of interpolation or rectification. Alternatively, calibration metadata may be normalized post interpolation and/or rectification by a calibration data constructor 908 or other component of the rendering engine 900.

The data preprocessor 908 may also select the calibration points to use for interpolation based on the calibration point(s) associated with camera settings 904 most proximate to the real time camera settings 902 received from the camera control board. Once the closest calibration points are isolated, the data preprocessor 908 may extract the calibration parameter values for input into an interpolation process from the calibration file(s) 903. Interpolation processes leveraging a mesh grid having calibration points and a real time camera position arranged by their camera setting values may use the data preprocessor 908 to construct the mesh grid space.

In one example, calibration parameters maybe arranged in a calibration file as one or more matrices. It may not be possible to perform interpolation functions directly on these matrices, therefore, the data preprocessor 908 may need to process one or more calibration parameter matrices to extract one or more raw calibration parameters to interpolate. The intrinsic calibration parameters included in the intrinsic calibration metadata 905 may be arranged in a K matrix where:

$$K = \begin{bmatrix} f_x & \gamma & c_x \\ 0 & f_y & c_y \\ 0 & 0 & 1 \end{bmatrix}$$

Similarly, the rotation matrix included in the stereoscopic calibration metadata may be arranged in a rotation matrix (e.g., R). In one example, the rotation matrix is formed from the product of three elemental rotation matrices that describe the rotational offset of a left camera module relative to a right camera module in three dimensions (i.e. offset about the x, y, and z axes). The three elemental rotation matrices are generated using Euler angles that define the rotational offset angels between the left and right camera modules. Euler angles (e.g., $\theta_x$, $\theta_y$, $\theta_z$) may be arranged in elemental rotation matrices where:

$$R_x = \begin{bmatrix} 1 & 0 & 0 \\ 0 & \cos(\theta_x) & -\sin(\theta_x) \\ 0 & \sin(\theta_x) & (\cos \theta_x) \end{bmatrix}$$

$$R_y = \begin{bmatrix} \cos(\theta_y) & 0 & \sin(\theta_y) \\ 0 & 1 & 0 \\ -\sin(\theta_y) & 0 & (\cos \theta_y) \end{bmatrix}$$

$$R_z = \begin{bmatrix} \cos(\theta_z) & -\sin(\theta_z) & 0 \\ \sin(\theta_z) & (\cos \theta_z) & 0 \\ 0 & 0 & 1 \end{bmatrix}$$

The product of the three elemental rotation matrices forms the rotation matrix (e.g., R) where $R = R_z R_y R_x$. In one possible implementation, the data preprocessor 908 extracts focal lengths ($f_x$, $f_y$), distortion centers ($c_x$, $c_y$), and the skew coefficient between the x and y directions ($\gamma$) from the K matrix. The data preprocessor 908 may similarly extract the Euler angels (e.g., $\theta_x$, $\theta_y$, $\theta_z$) from the elemental rotation matrices and/or the rotation matrix. After extraction, the focal lengths ($f_x$, $f_y$), distortion centers ($c_x$, $c_y$), skew coefficient ($\gamma$), and Euler angels (e.g., $\theta_x$, $\theta_y$, $\theta_z$) are sent to the stereo interpolator 909 for interpolation.

Other operations performed by the data preprocessor 908 may include filtering for inaccurate or incomplete data using one or more fault tolerance thresholds or variance functions. If any deficiencies are found, the data preprocessor 908 may also replace, modify, or delete the corrupt data. Additionally, one or more formatting functions may be performed by the data preprocessor 908 to reformat image data, calibration parameters, and/or measurement data in an array, string, database file, data stream, data frame, machine readable file format (e.g., .json or .xml file), or data structure.

Image frames 907 or video sequences captured by a camera device may also be enhanced by the data preprocessor 908. For color images, the data preprocessor 906 may sharpen, correct, blend, or distort colors by modifying the white balance or one or more matrices consistent with a YUV color space or RGB color space. The YUV color space is composed of three distinct components Y, U, and V where each two dimensional matrix represents a specific component of the YUV space. The Y component is the luminance component that relates to the brightness of the image. The U and V components are chrominance components that relate to the specific color of the image. Each pixel in an image is represented by a vector in the YUV color space (i.e., some combination of the Y, U, and V components). To modify colors rendered in one or more pixels of an image, the data preprocessor 908 may alter a vector in the YUV color space or elements of the two dimensional Y,U,V matrices.

In some embodiments, the image is represented by three two dimensional matrices consistent with a RGB color space. The RGB color space is also composed of three distinct components R, G, and B where each two dimensional matrix represents a specific component of the RGB space. All three of the distinct components (i.e., R, G, and B components) are all chrominance components that relate to the specific color of the image. To modify colors rendered in one or more pixels of an image in an RGB color space, the data preprocessor 908 may alter elements of the two dimensional R,G,B matrices. It is appreciated that the image may be represented in any color space and is not limited to the YUV or RGB color spaces. The data preprocessor 908 may also modify color in images represented by matrices compatible with other color spaces.

In addition to color, other aspects of scene capture may also be improved by the data preprocessor 908. Occlusion zones, blurred edges between captured objects, out of focus areas, low resolution zones, and other image defects may be corrected by processing raw image frames 907 or video sequences using one or more image correction models executed on the data preprocessor 908. In one possible implementation, image correction models include machine learning models trained on image data (e.g., an occlusion zone blending model implemented as a convolutional neural network or a geometry and context convolutional neural network).

The stereo interpolator 909 derives real time calibration metadata for real time camera positions having real time camera settings 902 that are not associated with calibration points included in a calibration file(s) 903. By performing interpolation processes on data received from the data preprocessor 908, the stereo interpolator generates calibration metadata for any camera configuration having uncalibrated camera setting values in real time. In one example, the stereo interpolator 909 performs a sequence of linear and/or multi-dimensional interpolations to determine real time calibration metadata. Post generation, the real time calibration metadata is used to rectify image frames 907 and video sequences captured using camera configurations comprising one or more camera settings (e.g., baseline, zoom, focus aperture, aspect ratio, relative camera rotation, white balance, shutter, iris, stabilizer, and gain). In one implementation, calibration parameters for two or more calibration points having camera settings proximate to real time camera settings are interpolated using linear interpolation functions to generate real time calibration parameters. Alternatively, the stereo interpolator 909 may apply one or more multi-dimensional interpolation functions to calibration parameters corresponding to boundary points defining an area of mesh grid containing a real time camera position having real time camera settings. The boundary points may include calibration points contained in a calibration file, wherein the calibration points are associated with camera setting values most proximate to the real time camera setting values.

The stereo interpolator 909 may be configured to perform one interpolation computation for each calibration parameter. In instances where three camera settings (e.g., baseline, focus, and zoom) have values that do not map to a calibration point, values for each calibration parameter (e.g., $f_x$, $f_y$, $c_x$, $c_y$, $\gamma$, $k_1$, $k_2$, $k_3$, $\theta_x$, $\theta_y$, $\theta_z$, $T_x$, $T_y$, and $T_z$) must be interpolated to derive real time calibration parameters including. Other camera configurations include only a change in the baseline setting. In some cases, to generate real time calibration metadata at this camera setting, just the values for each extrinsic parameters (e.g., $\theta_x$, $\theta_y$, $\theta_z$, $T_x$, $T_y$, and $T_z$) need to be interpolated because intrinsic parameters may not significantly change when baseline changes and zoom and focus stay constant. Alternatively, camera intrinsic calibration parameters for the left and right channels may impact the stereoscopic calibration parameters, therefore, the stereo interpolator 909 may first interpolate the right and left channel intrinsic calibration parameters (e.g., focal length, distortion centers, x and y skew, and distortion coefficients) then interpolate the stereoscopic calibration parameters (e.g., Euler angles and translation distances).

In one non-limiting example interpolation sequence, the stereo interpolator 909 performs twenty-four interpolation computations for determining real time calibration metadata for a stereoscopic camera device having at least one uncalibrated baseline, zoom, or focus setting. Eight interpolation operations (four for each channel) are first performed to determine the real time intrinsic calibration parameters (focal length x, focal length y, distortion center x, and distortion center y) for the left and right channels. Ten interpolation computations (five for each channel) are then performed to determine the real time distortion coefficients ($k_1$, $k_2$, $k_3$, $k_4$, and $k_5$). Lastly, six interpolation computations for determining the real time Euler angels ($\theta_x$, $\theta_y$, $\theta_z$) and translation distances ($T_x$, $T_y$, $T_z$) between the right and left image channels are performed to complete the interpolation process. Other interpolation processes may involve more interpolation computations because they include steps for creating intermediate calibration points having intermediate calibration metadata between two or more calibration points. Subsequently, the values for the intermediate calibration metadata at two or more intermediate calibration points may be interpolated to generate the real time calibration parameters.

Once the interpolation computations are completed, the rectification data constructor 910 may create a virtual calibration point having real time calibration metadata for the real time camera settings. The rectification data constructor 910 generates the rectification ($R_1$, $R_2$) and projection matrices ($P_1$, $P_2$) using the real time calibration metadata. The rectification and projection matrices for the left image channel (e.g., $R_1$ and $P_1$) may be generated using real time calibration metadata for the left channel (e.g., $K_L$, $D_L$, R, and T) and the rectification and projection matrices for the right channel (e.g., $R_2$ and $P_2$) may be generated using real time calibration metadata for the right channel (e.g., $K_R$, $D_R$, R, and T).

The rectification data constructor 910 stores the real time calibration parameters corresponding to the virtual calibration point in a real time calibration file and the rectification and projection matrices for the left and right image channels as left and right rectification files. Both files are written to memory and are readable by other components of the stereo image rectification and 3D rendering system including the raw image embedder 912 and the stereo rectifier 911. In one possible implementation, the raw image embedder 912 may read a real time calibration file and/or rectification file and embed some or all of the real time calibration and/or rectification metadata in the header, subtitle channel of other component of a raw image file.

During playback, the stereo rectifier 911 may read a left channel rectification file and a left image frame 907 to generate a left rectified image. Similarly, the stereo rectifier 911 may read a right channel rectification file and a right image frame 907 to produce a rectified right image. To rectify images for a range of camera setting values, the interpolation process and subsequent generation of rectification and projection matrices is performed every time the value for a camera setting (e.g., zoom, baseline, or focus) changes to a camera setting value that does not map to a calibration point. For camera positions having two or more unknown camera settings, nonlinear interpolation functions including two dimensional nearest neighbor, bilinear, bicubic, or bipolynomial interpolations can be used to interpolate in two or more dimensions.

Components of the rendering engine 900 may use one or more DSP, CPU, NPU and/or GPU implementations to rectify stereo images. In one possible configuration, the data preprocessor 908 includes a CPU implementation for performing operations on real time settings 902 and calibration file(s) 903 and a GPU implementation for processing image frames 907 and video sequences. CPU implementations of the stereo interpolator 909 and rectification data constructor 910 may derive real time calibration metadata for uncalibrated real time camera settings, generate rectification matrices, and write real time calibration and rectification files. Image rectification instructions included in the stereo rectifier 911 may be implemented on a GPU to convert raw image frames into rectified images and video sequences. CPU implementations may leverage one or more computer vision libraries and/or frameworks (e.g., OpenCV). GPU implementations may use one or more cross language, cross platform application programming interfaces or frameworks (e.g., OpenGL or OpenCL) to achieve hardware acceleration for image processing operations.

Raw, unrectified image frames including embedded calibration and/or rectification metadata may be encoded into an image (e.g., .jpeg) or video file (e.g., .mp4) by an encoder 914. Embedded metadata may be used to playback calibrated and rectified images and video sequences on a display screen 915 or over a content delivery network. In other implementations, the encoder 914 may encode the full raw image frame into an image file, video sequence, or real time steaming protocol (RTSP) video stream.

Alternatively, rectified image frames from the stereo rectifier 911 may undergo further processing by a post rectification processor 913. In one example, the post rectification processor 913 may generate one or more depth representations from a rectified image. Non-limiting example depth representations include disparity maps, depth maps, point clouds, 3D scans, and surface scans. Depth information may be encoded into one or more rectified images (e.g., .jpeg or .png file) or video sequences (e.g., .mp4 file) by an encoder 914 to allow a media player to read the encoded depth information and generate a 3D image or video sequence on a display 915.

Figure 10:
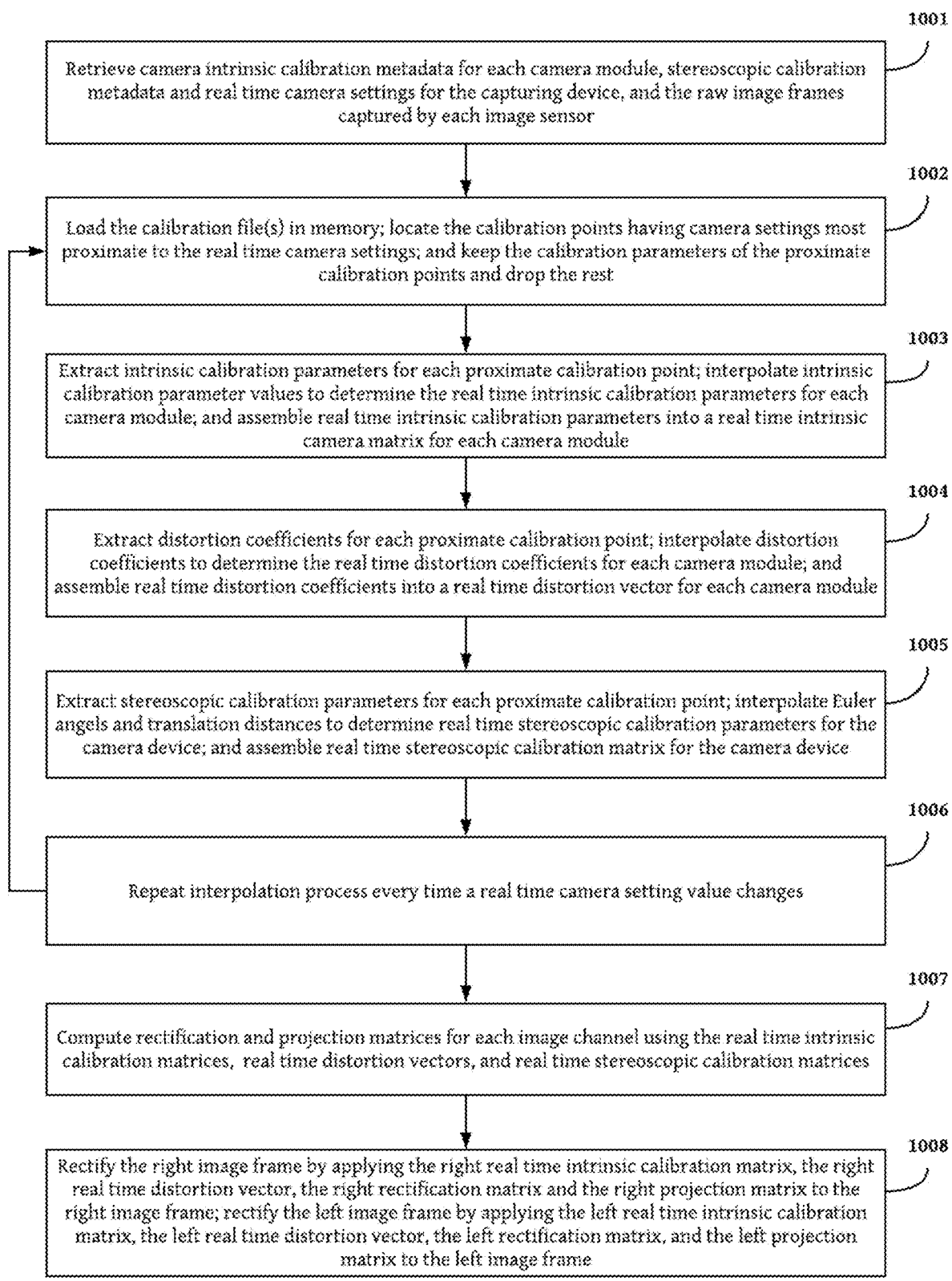
FIG. 10 shows a sample process for rectifying stereo images using interpolated calibration parameters.

FIG. 10 displays an example process for rectifying right and left image frames using real time calibration metadata generated by an interpolation process. Block 1001 describes a data retrieval process for aggregating information required to interpolate real time calibration parameters for real time camera settings that do not correspond to camera settings at a calibration point. In one implementation, camera intrinsic calibration metadata for each camera module, stereoscopic calibration metadata and real time camera settings (e.g., baseline, zoom, focus, etc.) for the capturing camera device, and the raw image frames captured by the camera device are collected by the data preprocessor.

A process for preparing calibration metadata for interpolation is described in block 1002. In one example, a calibration file(s) containing calibration metadata for calibration points associated with unique camera setting values is loaded into memory as a matrix of intrinsic and extrinsic calibration parameters. The data preprocessor may search the calibration file(s) to locate the calibration points associated with camera setting values most proximate to the real time camera settings. Calibration parameters corresponding to the proximate calibration points are extracted from the matrix of intrinsic and extrinsic calibration parameters and stored in memory. All other calibration metadata may be excluded. In other examples, a mesh grid may be assembled using every calibration point included in a calibration file(s). The calibration points to use in the interpolation process may be selected according to the location of the real time camera position within the mesh grid having one dimension per camera setting.

Blocks 1003-1005 describe a process for interpolating intrinsic calibration parameters, distortion coefficients, and stereoscopic calibration parameters to derive rectification and projection matrices for real time camera settings that do not map to a calibration point. As shown in block 1003, intrinsic calibration parameters (e.g., $f_x$, $f_y$, $c_x$, $c_y$, and $\gamma$) are extracted from the intrinsic calibration parameter matrix for the left image channel (e.g., $K_1$) and the right image channel (e.g., $K_2$) included in the calibration file stored in memory. An interpolation function is then applied to the intrinsic calibration parameters corresponding to the calibration points having camera setting values most proximate to the real time camera settings to derive the real time calibration parameters that map to the real time camera settings. Real time calibration parameters are then assembled into a real time intrinsic camera matrix for each image channel (e.g., $K_L'$, $K_R'$).

To interpolate distortion coefficients at the real time camera settings, distortion coefficients for each image channel (e.g., $k_1$, $k_2$, $k_3$) associated with calibration points having camera setting values most proximate to the real time camera setting values are extracted from memory. As shown in block 1004, an interpolation function is then applied to the extracted distortion coefficients to derive real time distortion coefficients that map to the real time camera settings (e.g., $k_1'$, $k_2'$, $k_3'$). The real time distortion coefficients are then assembled into a real time distortion vector for each image channel ($D_L'$, $D_R'$).

Block 1005 shows a process for generating real time stereoscopic calibration parameters for real time camera settings that do not correspond to camera settings at a calibration point. To derive real time stereoscopic metadata from stereoscopic metadata associated with a calibration point stored in a calibration file, stereoscopic calibration parameters (e.g., $\theta_x$, $\theta_y$, $\theta_z$, $T_x$, $T_y$, $T_z$) are extracted from the rotation (e.g., $R_1$, $R_2$) and transformation matrices (e.g., $T_1$, $T_2$) associated with the calibration points having the camera setting values most proximate to the real time camera setting values. An interpolation function is applied to the extracted stereoscopic calibration parameters to derive real time stereoscopic calibration parameters that map to the real time camera settings (e.g., $\theta_x'$, $\theta_y'$, $\theta_z'$, $T_x'$, $T_y'$, $T_z'$). The interpolated Euler angles (e.g., $\theta_x'$, $\theta_y'$, $\theta_z'$) are then used to generate the real time elemental (e.g., Rx', Ry', Rz') and combined (e.g., R') rotation matrices for the camera device. The interpolated transformation distances (e.g., $T_x'$, $T_y'$, $T_z'$) are also assembled into a real time transformation vector (e.g., T). The real time transformation vector and rotation matrix are then combined with the real time distortion vectors and real time intrinsic calibration matrices for each image channel to generate real time calibration metadata that maps to a virtual calibration point having real time camera settings.

As shown in block 1007, the real time intrinsic calibration metadata and the real time distortion vectors are used to compute the rectification and projection matrices for each image channel. Rectification and projection matrices are then used in the rectification process described in block 1008. In this example, image rectification occurs by applying the right real time intrinsic calibration matrix ($K_R'$), the right real time distortion vector ($D_R'$), the right rectification matrix ($R_2'$) and the right projection matrix ($P_2'$) to a right image frame. Similarly, the left real time intrinsic calibration matrix ($K_L'$), the left real time distortion vector ($D_R'$), the left rectification matrix ($R_2'$), and the left projection matrix ($P_2'$) are applied to the left image frame to generate a rectified left image. As shown in block 1006, the interpolation process must be completed for every change in baseline, focus, or zoom that displaces the camera settings from a calibration point. Once the interpolated calibration metadata is derived, rectification steps shown in 1007 and 1008 are used to rectify the image captured at a non calibrated camera settings.

Multi-Camera System Implementations

Figure 11:
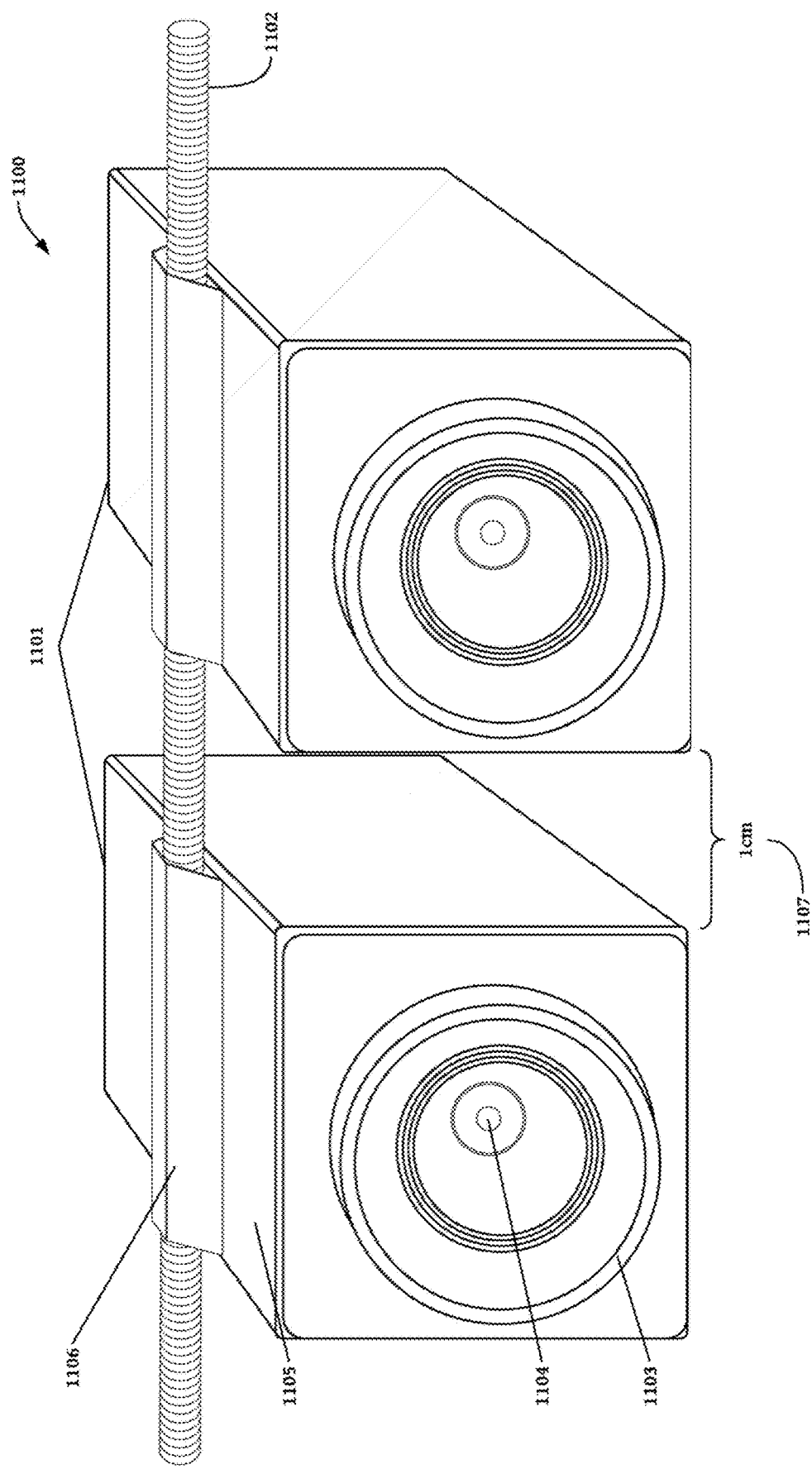
FIGS. 11 and 12 show an example stereo camera embodiment having adjustable baseline camera settings.
Figure 12:
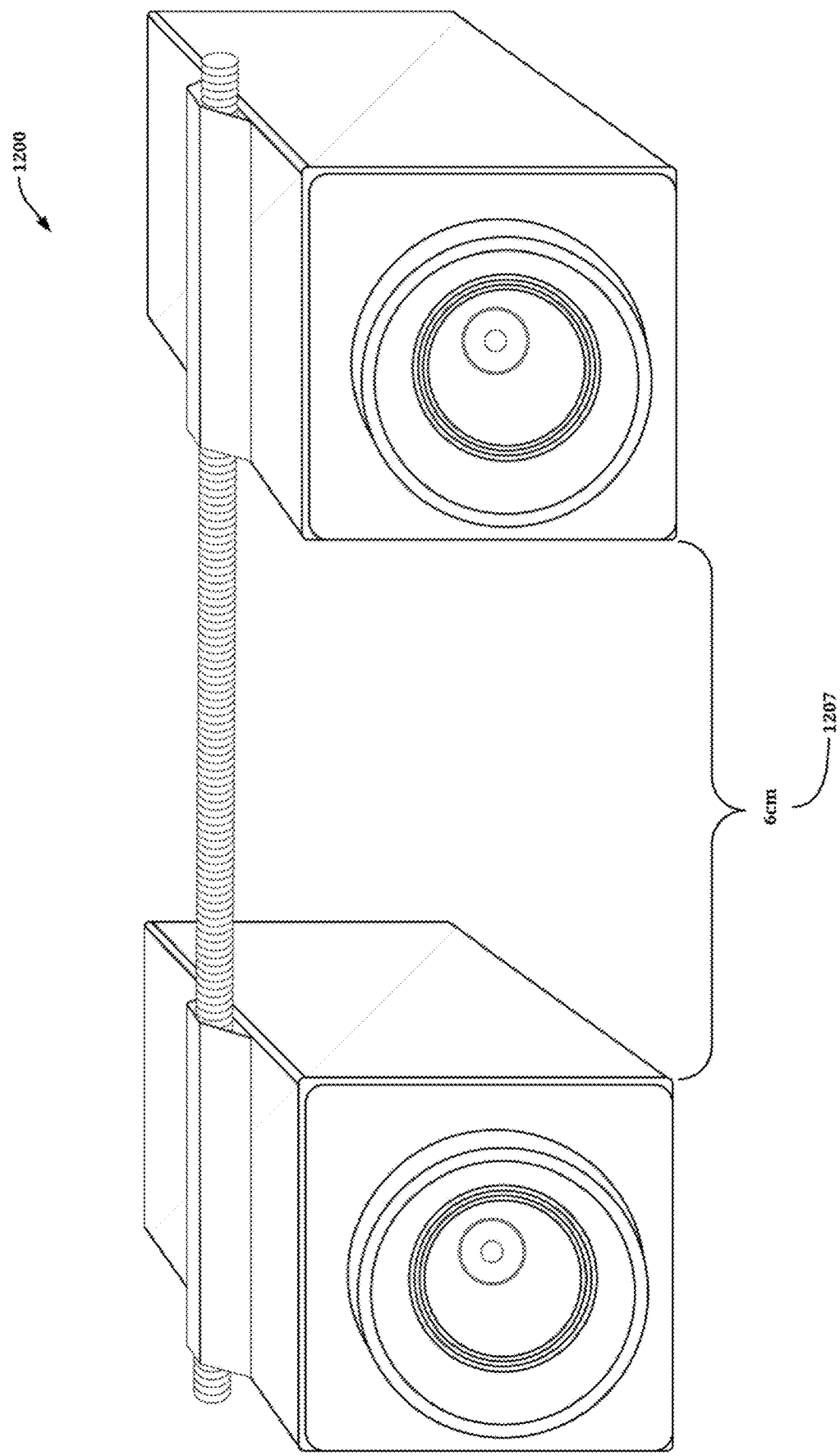

The stereo image rectification and 3D rendering system may be used with camera systems having two or more cameras. One example multi-camera system having multiple camera settings (e.g., focus, zoom, baseline, aperture, aspect ratio, relative camera rotation, white balance, shutter, iris, stabilizer, and gain) is shown in FIGS. 11-12. The stereo image rectification and 3D rendering system may be used in multi-camera systems to rectify stereo images and render 3D images and video sequences. To adjust the baseline in a camera system, the interocular distance between the two image sensors must be changed.

FIG. 11 shows a stereo camera system 1100 having two camera modules 1101 connected by a threaded track 1102. Each camera module 1101 includes a lens 1103 positioned in front of an image sensor 1104 contained in a camera module housing 1105. A track attachment member 1106 extends out from the top surface of the camera module housing 1105 and receives the threaded track 1102 through an open portion cut into the center of the track attachment member 1106. The inner surface of the track attachment member 1106 may include threads that fit inside the threads on the threaded track 1102. Alternatively, the track attachment member 1106 may slide horizontally over the surface of the threaded track 1102 when the camera modules move horizontally along the threaded track 1102.

Optionally, an electric motor may be contained inside the camera module housing 1105 to provide power for moving the camera modules 1101. The electric motor may be programmed to move the camera modules in precise increments (e.g., 0.1 cm or 1 mm). The total distance and direction moved by the camera modules 1101 may be recorded and then stored in memory so that the distance may be displayed in a graphical user interface (GUI) for controlling the stereo camera system 1100. Alternatively, a force from a source external to the camera modules 1101 (e.g., an external motor or a mechanical lever) may be applied to wind the threaded track 1102 or otherwise move the camera modules 1101.

Independent of the mechanism for moving the camera modules 1101 on the threaded track 1102, the recorded distance moved by the camera modules may be used to derive a interocular distance measurement 1107 that describes the baseline setting of the stereo camera system 1100. In one implementation, a processor (e.g., CPU, GPU, NPU, DSP) contained in the camera module housing 1105 calculates the interocular distance measurement 1107 by first determining a starting position (e.g., in cm) for the camera modules 1101 then using the recorded distance (e.g., in cm) and direction (e.g., away from center or toward center) moved by the camera modules 1101 to calculate the change in position. The interocular distance measurement 1107 is then determined by adding the change in position to the starting position if the direction is away from the center and subtracting the change in position from the starting position if the direction is toward the center of the of the threaded track 1102.

FIG. 11 shows the stereo camera system having a near orientation with a narrow interocular distance measurement 1107 and a low baseline setting (e.g., 1 cm). In this orientation, the distance between objects in the background and objects in the foreground is limited, therefore, the 3D effect is reduced. FIG. 12 displays the stereo camera system 1200 having a far orientation with a wide interocular distance measurement 1207 and a high baseline setting (e.g., 6 cm). The 3D effect is increased in this orientation because the higher baseline setting adds more depth to the image, thereby making the objects in the background appear further away from objects in the foreground.

A multi-camera system for implementing the stereo image rectification and 3D rendering system is shown FIG. 13-14. A perspective view of an eight camera system is shown in FIG. 13 and FIG. 14 illustrates an overhead view of the eight camera system. To capture moving objects within a scene, the multi-camera system may be attached to a moveable stand (e.g., a tripod, rolling cart, push cart dolly, or tracked jib). In one implementation, the moveable stand includes an electric motor that moves the mounted multi-camera system to a different location. Optionally, the multi-camera system may include a GUI for controlling the camera modules 1301 and/or the moveable stand.

The multi-camera system includes eight camera modules 1301 arranged in a circular orientation around a central power supply 1302. Each camera module 1301 has a lens assembly 1303, an image sensor 1304, a component housing 1305, and connection cords 1306. In one implementation, the camera modules are arranged in a tray 1307. Optionally, the tray 1307 may have a lid (not shown) for enclosing the component housing 1305 and connection cords 1306 for each camera module 1301. The tray 1307 and/or the lid may have recessed areas molded to the shape of the component housing 1305, connection cords 1306, and/or central power supply 1302. The tray 1307 and lid may also have symmetrical semicircular openings that fit around the lens assembly 1303. By allowing the camera system components (e.g., 1303, 1304, 1305, 1306, and 1307) to be built into the tray 1307 and/or lid, the recessed areas and semicircular openings help secure the camera system components inside the tray 1307 and prevent the components from moving or becoming damaged when the camera assembly moves.

Multi-camera systems implementing the stereo image rectification and 3D rendering system may provide adjustable baseline, zoom, and focus when capturing 360 degree views of a scene. In one implementation, the multi-camera system is placed at the center of a scene. Each camera module 1301 captures the portion of the scene within its field of view (e.g., 80-120 horizontal degrees). Image frames from each of the eight camera modules 1301 can then be rectified using the stereo image rectification and 3D rendering system described in FIG. 9. Post rectification, a 3D display may be rendered using the rectified images. The 3D display may be formatted for view on VR or AR device (e.g., a HMD having a rectilinear display).

To provide the 3D display, the rectified images may be combined or stitched together to form a cohesive scene object that captures the scene at many different perspectives. Upon playback, rectified images captured at each perspective may be selectively used to render the 3D display according to the angle and position of the HMD. For example, if a user wearing an HMD turns 60 degrees to the left images from the camera modules 1301 closest to the user's angle of perspective are used to generate the 3D display. This multi-camera system implementation allows depth to be more accurately rendered at a greater number of angels of perspective because at least one of the eight camera modules 1301 will always be oriented to capture the portion of the scene displayed to the user with the main portion of an image sensor. Depth is more accurately captured at the center of an image and less accurately captured at the edges of a frame, therefore combining multi-image frames from different portions within the same scene provides a more realistic 3D experience by assuring the 3D displays are always rendered from one or more central portions of an image frame.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above, are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method of calculating real time calibration parameters for a camera device having a first camera setting and a second camera setting, the method comprising: providing a library of calibration files, each calibration file associated with a unique value for the first camera setting and a unique value for the second camera setting, each calibration file further having a calibration parameter matrix including extrinsic calibration parameters for the camera device, the calibration parameter matrix further having intrinsic calibration parameters for the first and second camera modules; detecting a real time value for the first camera setting from the camera device and locating, within the library of calibration files, two calibration files associated with values for the first camera setting most proximate to the real time value for the first camera setting; detecting a real time value for the second camera setting from the camera device and locating, within the library of calibration files, two calibration files associated with values for the second camera setting most proximate to the real time value for the second camera setting; extracting the intrinsic calibration parameters and the extrinsic calibration parameters from the two calibration files associated with the first camera setting; applying an interpolation function to the intrinsic calibration parameters and receiving as an output of the interpolation function a first set of intermediate intrinsic calibration parameters for the first camera module and the second camera module having the real time value for the first camera setting; applying the interpolation function to the extrinsic calibration parameters and receiving as an output of the interpolation function a first set of intermediate extrinsic calibration parameters for the camera device having the real time value for the first camera setting; extracting the intrinsic calibration parameters and the extrinsic calibration parameters from the two calibration files associated with the second camera setting; applying the interpolation function to the intrinsic calibration parameters and receiving as an output of the interpolation function a second set of intermediate intrinsic calibration parameters for the first camera module and the second camera module having the real time value for the second camera setting; applying the interpolation function to the extrinsic calibration parameters and receiving as an output of the interpolation function a second set of intermediate extrinsic calibration parameters for the camera device having the real time value for the second camera setting; applying the interpolation function to the first set of intermediate intrinsic calibration parameters and the second set of intermediate intrinsic calibration parameters and receiving as an output of the interpolation function real time intrinsic calibration parameters for the camera device having the real time value for the first camera setting and the real time value for the second camera setting; and applying the interpolation function to the first set of intermediate extrinsic calibration parameters and the second set of intermediate extrinsic calibration parameters and receiving as an output of the interpolation function real time extrinsic calibration parameters for the camera device having the first real time value for the first camera setting and the real time value for the second camera setting.

2. The method of claim 1 wherein the extrinsic calibration parameters include a rotation matrix formed by multiplying three elemental rotation matrices, each elemental rotation matrix including trigonometric functions of an Euler angle.

3. The method of claim 2, wherein the extrinsic calibration parameters are extracted from the two calibration files associated with the first camera setting and the two calibration files associated with the second camera setting by, within each calibration file, separating the elemental rotation matrices from the rotation matrix and deriving an x dimension Euler angle from an x dimension elemental rotation matrix, deriving a y dimension Euler angle from an y dimension elemental rotation matrix, and a z dimension Euler angle from a z dimension elemental rotation matrix.

* * * * *